United States Patent
Mizusaki et al.

(10) Patent No.: US 11,530,357 B2
(45) Date of Patent: Dec. 20, 2022

(54) LIQUID CRYSTAL ALIGNMENT AGENT AND LIQUID CRYSTAL PANEL

(71) Applicant: SHARP KABUSHIKI KAISHA, Sakai (JP)

(72) Inventors: Masanobu Mizusaki, Sakai (JP); Hiroshi Tsuchiya, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 337 days.

(21) Appl. No.: 16/628,013

(22) PCT Filed: Jun. 29, 2018

(86) PCT No.: PCT/JP2018/024773
§ 371 (c)(1),
(2) Date: Dec. 31, 2019

(87) PCT Pub. No.: WO2019/009192
PCT Pub. Date: Jan. 10, 2019

(65) Prior Publication Data
US 2020/0208056 A1 Jul. 2, 2020

(30) Foreign Application Priority Data
Jul. 6, 2017 (JP) .............................. JP2017-132831

(51) Int. Cl.
*C09K 19/56* (2006.01)
*C08G 73/18* (2006.01)
(Continued)

(52) U.S. Cl.
CPC .............. *C09K 19/56* (2013.01); *C08G 73/18* (2013.01); *C08G 73/22* (2013.01);
(Continued)

(58) Field of Classification Search
CPC ................ C09K 19/56; C09K 2323/02; C09K 2323/025; C08G 73/18; C08G 73/22;
(Continued)

(56) References Cited

U.S. PATENT DOCUMENTS

2005/0249961 A1  11/2005  Saitoh et al.
2008/0069974 A1  3/2008  Shin

FOREIGN PATENT DOCUMENTS

JP  2004-107621 A  4/2004
JP  2008-077050 A  4/2008

*Primary Examiner* — Ruiyun Zhang
(74) *Attorney, Agent, or Firm* — ScienBiziP, P.C.

(57) ABSTRACT

The present invention provides a liquid crystal alignment agent having high thermal stability and high solvent solubility, and a liquid crystal panel in which occurrence of ghosting and stain and a decrease in contrast are suppressed even under environments at high temperatures long period of time. The present invention is a liquid crystal alignment agent including a copolymer including a structure represented by a chemical formula (1) below, and a solvent. In the formula, X is a specified structure including a cyclic hydrocarbon group, $Y^1$ is a specified structure including a cyclic hydrocarbon group, $R^1$ represents a homogeneous alignment group, a homeotropic alignment group, or a photoreactive functional group, and $Z^1$ and $Z^2$ are the same or different, and represent an —NH— group, an —O— group, or a —S— group.

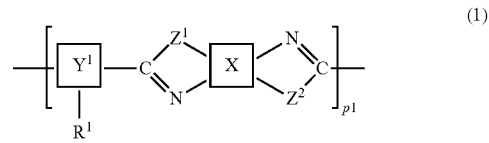

(1)

12 Claims, 1 Drawing Sheet

(51) Int. Cl.
*C08G 73/22* (2006.01)
*G02F 1/1337* (2006.01)

(52) U.S. Cl.
CPC .... *C09K 2323/02* (2020.08); *C09K 2323/027* (2020.08); *G02F 1/133723* (2013.01); *G02F 1/133788* (2013.01)

(58) Field of Classification Search
CPC ... C08G 73/1096; C08G 86/40; G02F 1/1337; G02F 1/133723; G02F 1/133788
USPC .................. 428/1.2, 1.26, 1.1; 349/123, 127
See application file for complete search history.

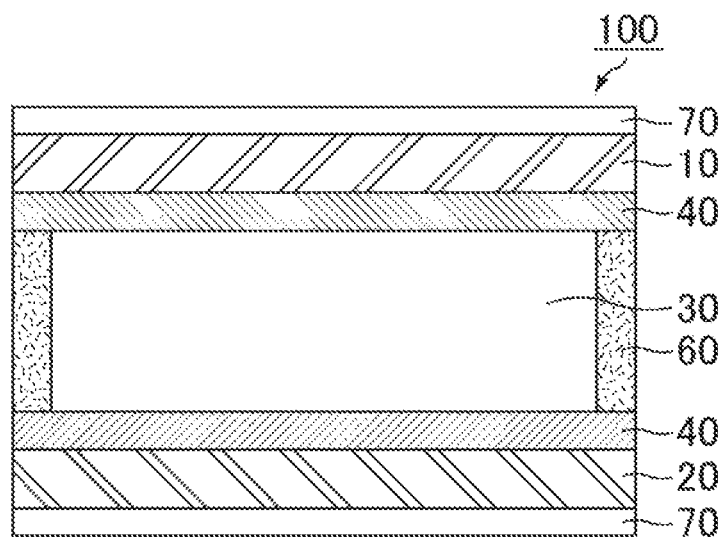

LIQUID CRYSTAL ALIGNMENT AGENT AND LIQUID CRYSTAL PANEL

TECHNICAL FIELD

The present invention relates to a liquid crystal alignment agent, and a liquid crystal panel including an alignment film formed from the liquid crystal alignment agent.

BACKGROUND ART

Liquid crystal display apparatuses are display apparatuses that use liquid crystal compositions for displaying, and the representative display mode is as follows: a liquid crystal panel in which a liquid crystal composition is enclosed between a pair of substrates is irradiated with light from a backlight while a voltage is applied to the liquid crystal composition to change the alignment of liquid crystal molecules, to thereby control the amount of light passing through the liquid crystal panel.

In general, in a liquid crystal display apparatus, the alignment of liquid crystal molecules under no application of voltage is controlled with alignment films having been subjected to an alignment treatment. Regarding materials for such alignment films, there are known alignment films formed of polymers such as polyimide (polyamic acid)-based compounds, polysiloxane-based compounds, or polyvinyl-based compounds. However, in liquid crystal panels including alignment films formed of such compounds, ghosting and stain sometimes occur in display regions. In particular, when liquid crystal panels are left in environments at high temperatures, ghosting and stain are more likely to occur.

In environments at high temperatures, in order to prevent degradation of the display quality of liquid crystal panels, for example, in Patent Literature 1, use of alignment films has been studied that are formed of polymers in which a photoactinic group is bonded as a functional group to any one of a polybenzooxazole-based compound, a polybenzothiazole-based compound, and a polybenzoimidazole-based compound to provide improved heat resistance.

CITATION LIST

Patent Literature

PTL 1: Japanese Unexamined Patent Application Publication No. 2008-77050

SUMMARY OF INVENTION

Technical Problem

The cause of ghosting and stain in liquid crystal panels has been studied. In general, polymers forming such an alignment film have molecular weights distributed over a range. Polymers having relatively low molecular weights sometimes leach to the liquid crystal layer. The polymers having leached to the liquid crystal layer sometimes react with water present in a very small amount in the liquid crystal layer, or are sometimes ionized upon exposure to, for example, light or heat. The ionization of polymers having leached to the liquid crystal layer sometimes causes ghosting and stain.

The leaching of polymers having relatively low molecular weights to the liquid crystal layer can be suppressed by, for example, crosslinking among the polymers. A method for achieving crosslinking among the polymers may be a method of adding a low-molecular-weight additive such as an epoxy-based compound, a carboxylic acid-based compound, or an amine-based compound to the liquid crystal alignment agent Crosslinking among polymers with the addition of the low-molecular-weight additive causes an increase in the molecular weights of the polymers, to thereby improve, for example, the crosslinking density, film hardness, and denseness of the alignment film, and to achieve suppression of leaching to the liquid crystal layer.

On the other hand, in the method of adding the low-molecular-weight additive, an unreacted low-molecular-weight additive sometimes leaches to the liquid crystal layer, and is ionized through a reaction with water present in a very small amount in the liquid crystal layer, which causes ghosting and stain. In addition, the low-molecular-weight additive is sometimes not uniformly distributed within the alignment film and is localized near molecules having a high affinity therefor, which results in non-uniform resistance values over the alignment film, and causes display unevenness. In particular, when a liquid crystal panel is used in environments at high temperatures, polymers having relatively low molecular weights and a low-molecular-weight additive in the alignment films tend to thermally diffuse into, as ionic impurities, the liquid crystal layer, which is more likely to result in ghosting and stain.

The inventors of the present invention studied a method for suppressing leaching of polymers forming the alignment film to the liquid crystal layer without use of the low-molecular-weight additive even in the case of use under environments at high for a long period of time, and focused on improvements in the heat resistance of the alignment film. However, the inventors of the present invention performed studies and have found the following findings: in the case of using the homopolymer (homopolymer) disclosed in PTL 1 above such as a polybenzooxazole-based compound, a polybenzothiazole-based compound, or a polybenzoimidazole based compound, the alignment film has improved heat resistance, but solubility in solvents (hereafter, also referred to as solvent solubility) is insufficient, so that, during formation of the alignment film, the alignment film is not formed in some regions on the substrate, which results in a decrease in the contrast of the liquid crystal panel.

The present invention has been made under the above-described circumstances. An object is to provide a liquid crystal alignment agent having high thermal stability and high solvent solubility, and a liquid crystal panel in which occurrence of ghosting and stain and a decrease in contrast are suppressed even in environments at high temperatures for a long period of time.

Solution to Problem

The inventors of the present invention studied a method for suppressing leaching of polymers having relatively low molecular weights from the alignment film into the liquid crystal layer without using the low-molecular-weight additive, and focused on the rigidity (molecular rigidity) of the polymers forming the alignment film. The inventors of the present invention performed studies and have found that the existing alignment films formed of polyimide-based compounds, polysiloxane-based compounds, or polyvinyl-based compounds have insufficient main-chain rigidity. For example, in the case of the polyimide-based compounds, auric acid moieties have high flexibility; the polysiloxane and the polyvinyl also have flexible structures. They have found that, in the case of flexible main-chain structures, polymers having relatively low molecular weights tend to undergo conformation changes, and tend to leach into liquid crystal.

The inventors of the present invention performed studies, and have found that higher molecular rigidity prevents conformation changes and inhibits, for example, translational motion and rotary motion, so that even polymers having relatively low molecular weights become less likely to leach into the liquid crystal layer. Accordingly, the inventors of the present invention studied a method for improving molecular rigidity, and focused on use of, as liquid crystal alignment agents, imidazole-based compounds, oxazole-based compounds, or thiazole-based compounds. They have found that, in the case of imidazole-based compounds, oxazole-based compounds, or thiazole-based compounds, even use under environments at high temperatures is less likely to cause leaching of the polymers, to provide improved heat resistance.

On the other hand, they have found that the homopolymers formed from imidazole-based compounds, oxazole-based compounds, or thiazole-based compounds have low solvent solubility, so that liquid crystal alignment agents including the homopolymers do not provide uniformly formed films.

The inventors of the present invention performed thorough studies and, as a result, have found that a crystal alignment agent including a structure represented by a chemical formula (1) below provides improved heat resistance, and such a liquid crystal alignment agent prepared as a copolymer provides improved solvent solubility to provide considerably improved coating performance. They have conceived that this successfully achieves the above-described object. Thus, they have arrived at the present invention.

Specifically, an embodiment of the present invention may be a liquid crystal alignment agent including a copolymer including a structure represented by a chemical formula (1) below, and a solvent,

[Chem. 1]

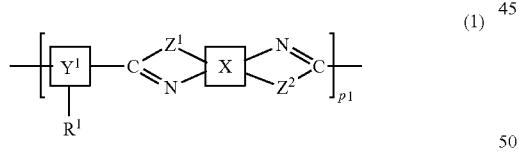

(1)

(where X is any one of structures represented by chemical formulas (X-1-1) to (X-1-9) below, or any one of structures represented by chemical formulas (X-2-1) to (X-2-4) below, $Y^1$ is any one of structures represented by chemical formulas (Y-1-1) to (Y-1-16) below, or any one of structures represented by chemical formulas (Y-2-1) to (Y-2-10) below, $Z^1$ and $Z^2$ are the same or different, and represent an —NH— group, an —O— group, or a —S— group, $R^1$ represents a homogeneous alignment group, a homeotropic alignment group, or a photoreactive functional group, and $p^1$ represents a repeat number, and is an integer of 1 or more,

[Chem. 2]

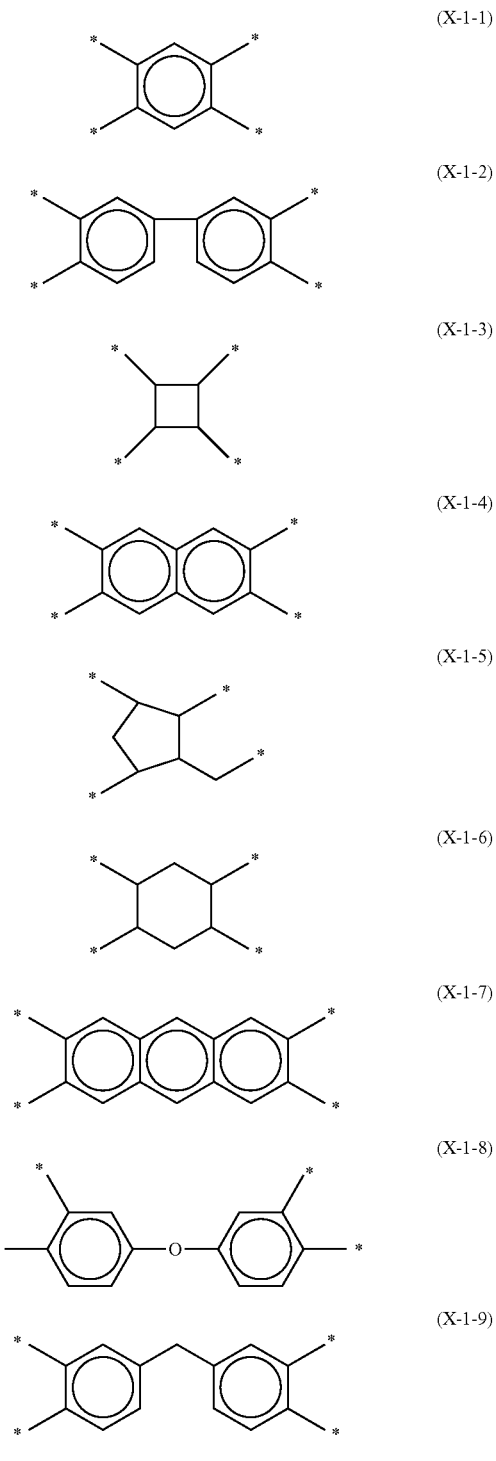

[Chem. 3]

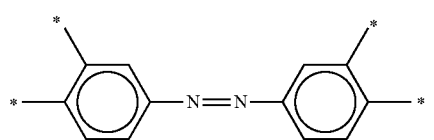

(X-2-2)
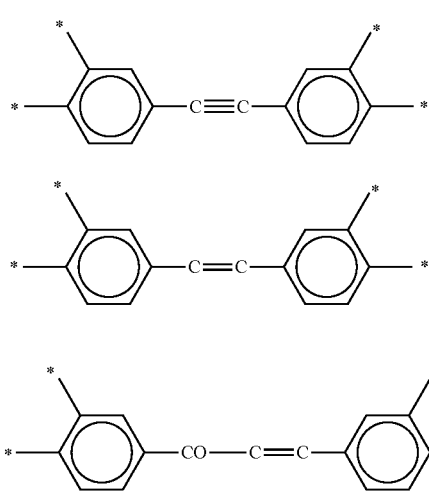
(X-2-3)
(X-2-4)
[Chem. 4]
(Y-1-1)
(Y-1-2)
(Y-1-3)
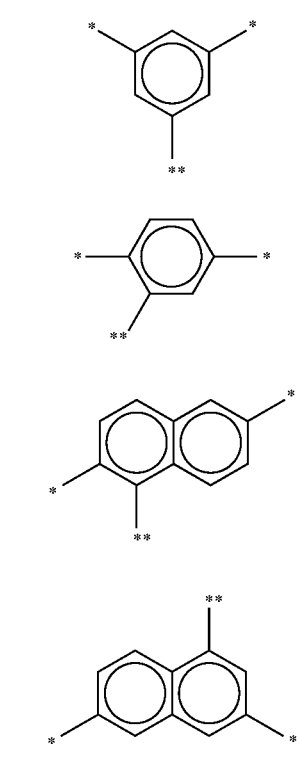
(Y-1-4)
(Y-1-5)
(Y-1-6)
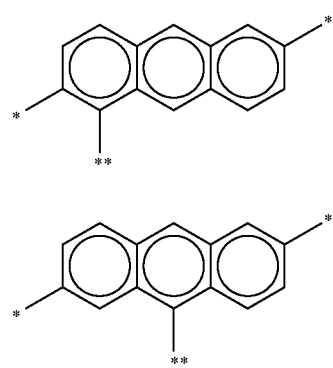
(Y-1-7)
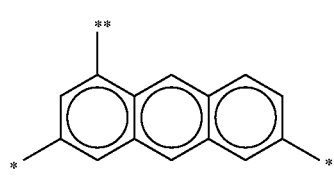
(Y-1-8)
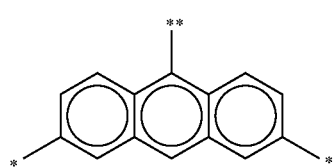
(Y-1-9)
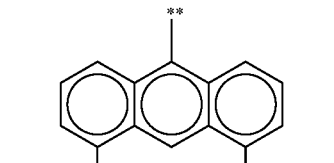
(Y-1-10)
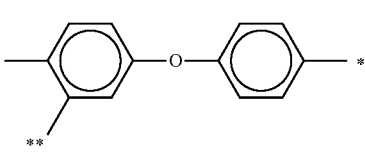
(Y-1-11)
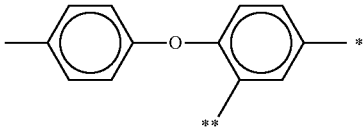
(Y-1-12)
(Y-1-13)
(Y-1-14)
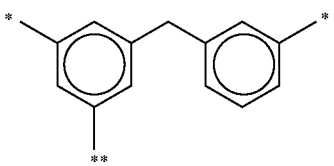
(Y-1-15)

-continued (Y-1-16)
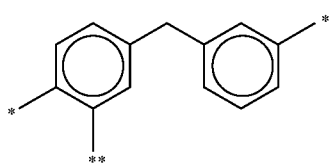

[Chem. 5]

(Y-2-1)
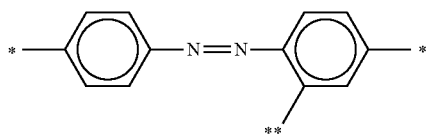

(Y-2-2)
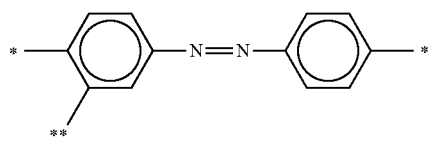

(Y-2-3)
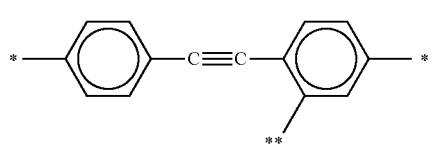

(Y-2-4)
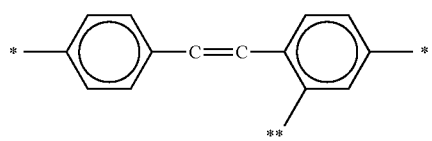

(Y-2-5)
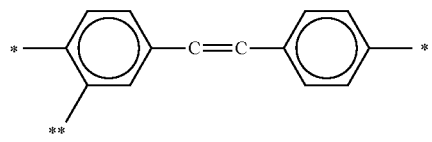

(Y-2-6)
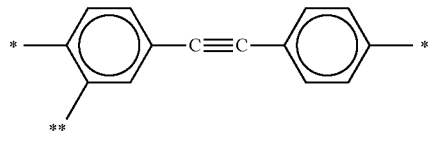

(Y-2-7)
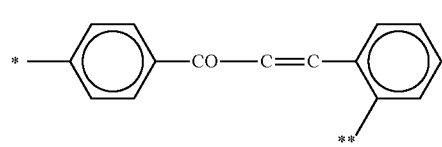

(Y-2-8)
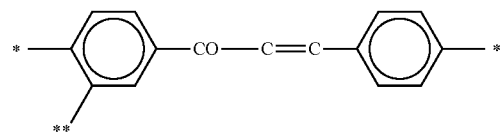

-continued (Y-2-9)
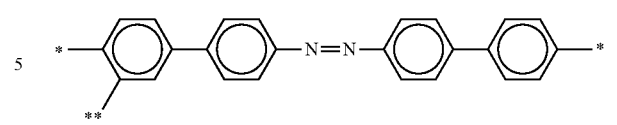

(Y-2-10)
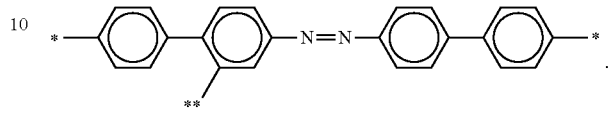

Another embodiment of the present invention may be a liquid crystal panel including a pair of substrates, a liquid crystal layer held between the pair of substrates, and an alignment film disposed between at least one of the pair of substrates, and the liquid crystal layer, wherein the alignment film includes a structure derived from a copolymer including a structure represented by a chemical formula (1) below,

[Chem. 6]

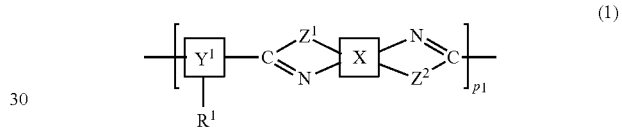
(1)

(where X is any one of structures represented by chemical formulas (X-1-1) to (X-1-9) below, or any one of structures represented by chemical formulas (X-2-1) to (X-2-4) below, $Y^1$ is any one of structures represented by chemical formulas (Y-1-1) to (Y-1-16) below, or any one of structures represented by chemical formulas (Y-2-1) to (Y-2-10) below, $Z^1$ and $Z^2$ are the same or different, and represent an —NH— group, an —O— group, or a —S— group, $R^1$ represents a homogeneous alignment group, a homeotropic alignment group, or a photoreactive functional group, and $p^1$ represents a repeat number, and is an integer of 1 or more),

[Chem. 7]

(X-1-1)
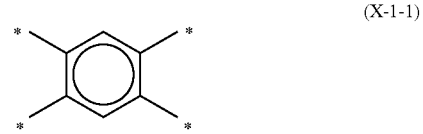

(X-1-2)
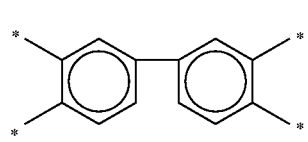

(X-1-3)
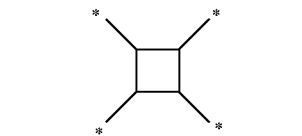

(X-1-4)
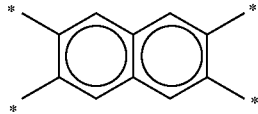
(X-1-5)
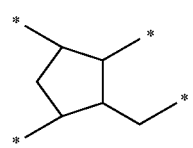
(X-1-6)
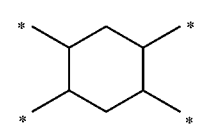
(X-1-7)
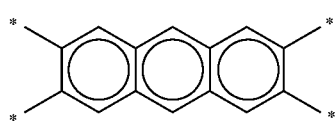
(X-1-8)
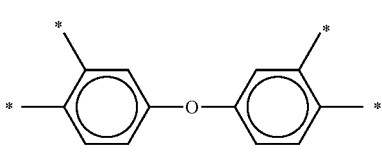
(X-1-9)
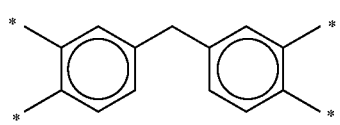
[Chem. 8]
(X-2-1)
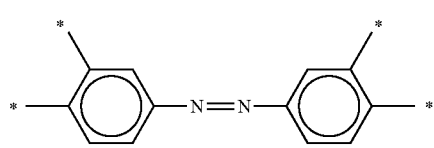
(X-2-2)
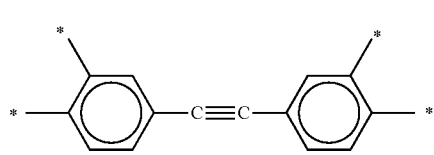
(X-2-3)
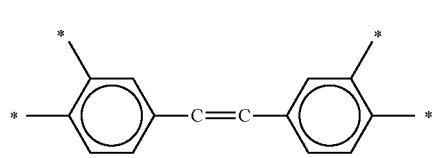
(X-2-4)
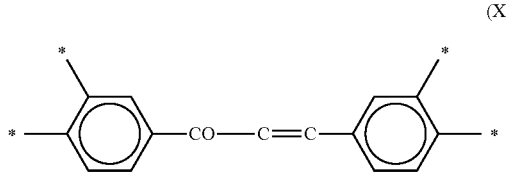
[Chem. 9]
(Y-1-1)
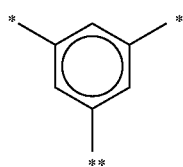
(Y-1-2)
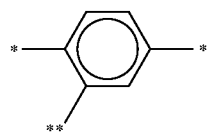
(Y-1-3)
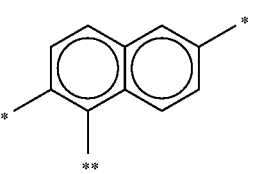
(Y-1-4)
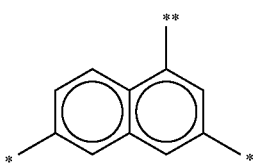
(Y-1-5)
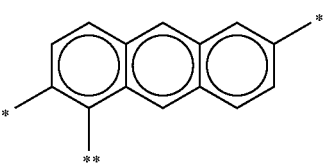
(Y-1-6)
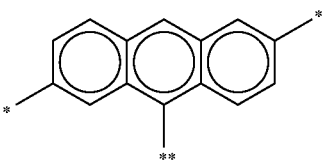
(Y-1-7)
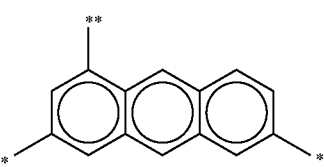
(Y-1-8)
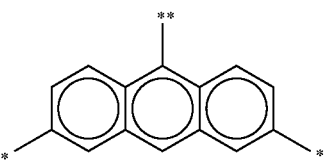

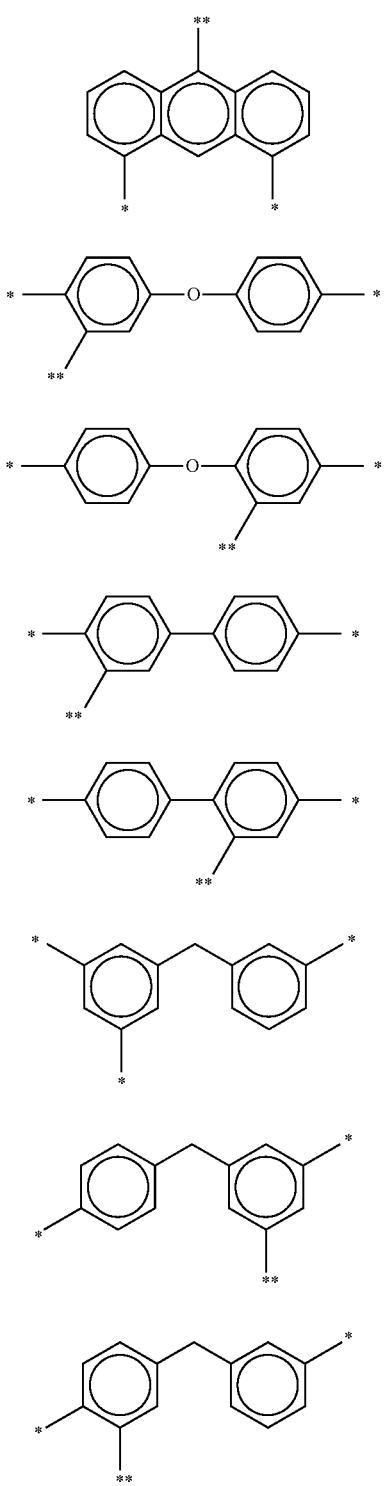
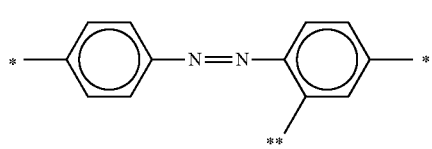
Advantageous Effects of Invention
A liquid crystal alignment agent according to the present invention has high thermal stability and high solvent solubility. In a liquid crystal panel according to the present invention, occurrence of ghosting and stain and a decrease in contrast are suppressed even under environments at high temperatures for a long period of time.

BRIEF DESCRIPTION OF DRAWING

FIG. 1 is a sectional view schematically illustrating an example of a liquid crystal panel according to Embodiment 2.

DESCRIPTION OF EMBODIMENTS

Hereinafter, embodiments according to the present invention will be described. The present invention is not limited to the contents described in the following embodiments. The embodiments can be appropriately changed in the design within the scope of the present invention.

Embodiment 1

[Liquid Crystal Alignment Agent]

An embodiment of the present invention may be a liquid crystal alignment agent including a copolymer including structure represented by the following chemical formula (1), and a solvent. The liquid crystal alignment agent is a polymer composition for forming a film having a function of controlling the alignment of liquid crystal molecules adjacent to the formed film. Incidentally, in this Description, *in chemical formulas represent points of bonding to copolymers. In chemical formulas, **represent, in $Y^1$ or $Y^2$, points of bonding to side chains ($R^1$ or $R^2$).

[Chem. 11]

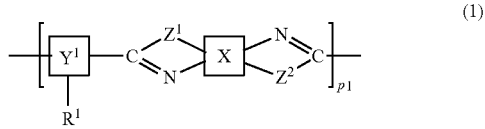
(1)

(where X is any one of structures represented by the following chemical formulas (X-1-1) to (X-1-9), or any one of structures represented by the following chemical formulas (X-2-1) to (X-2-4), $Y^1$ is any one of structures represented by the following chemical formulas (Y-1-1) to (Y-1-16), or any one of structures represented by the following chemical formulas (Y-2-1) to (Y-2-10), $Z^1$ and $Z^2$ are the same or different, and represent an —NH— group, an —O— group, or a —S— group, $R^1$ represents a homogeneous alignment group, a homeotropic alignment group, or a photoreactive functional group, and $p^1$ represents a repeat number, and is an integer of 1 or more),

[Chem. 12]

(X-1-1)

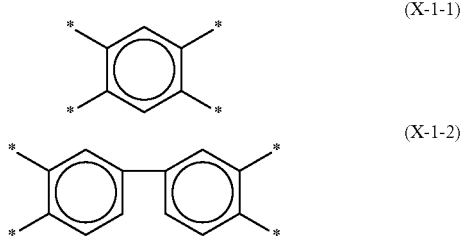

(X-1-2)

(X-1-3)

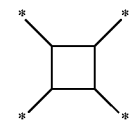

(X-1-4)

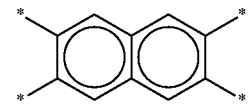

(X-1-5)

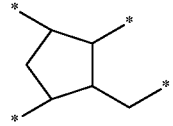

(X-1-6)

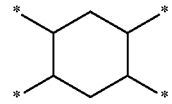

(X-1-7)

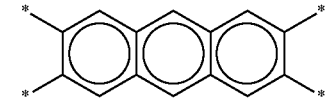

(X-1-8)

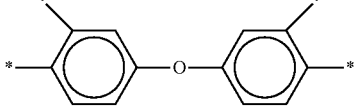

(X-1-9)

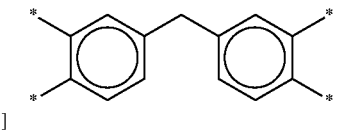

[Chem. 13]

(X-2-1)

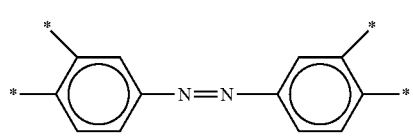

(X-2-2)

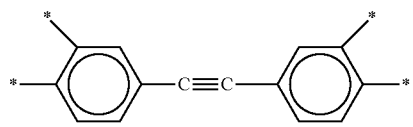

(X-2-3)

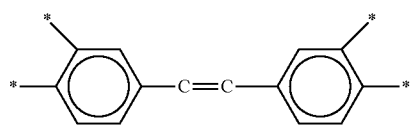

(X-2-4)

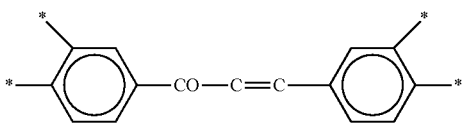

[Chem. 14]

(Y-1-1)

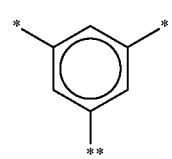

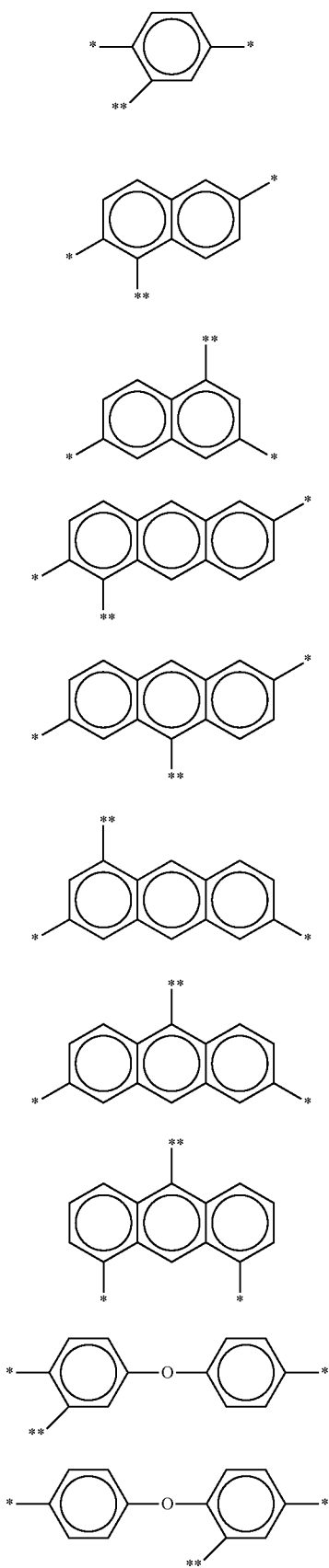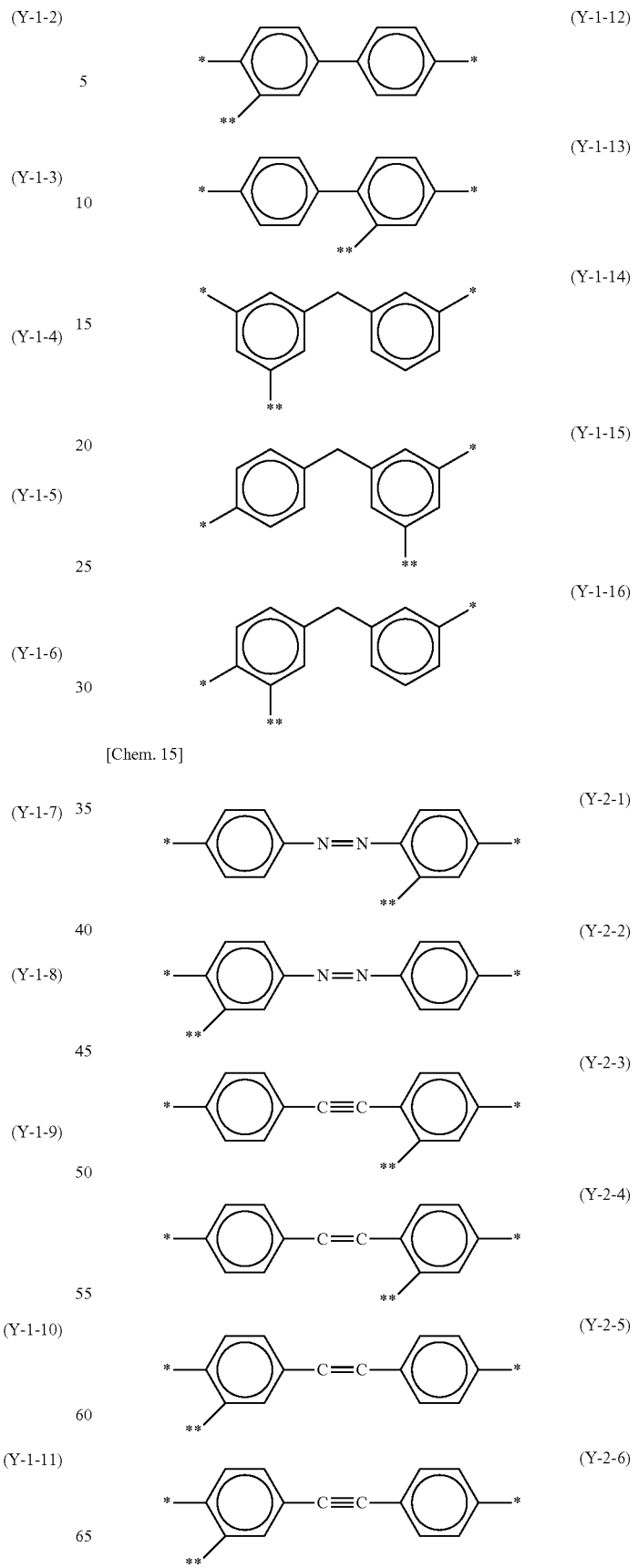

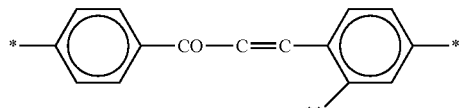
(Y-2-7)

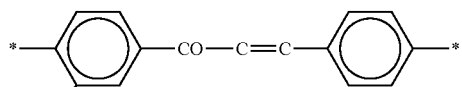
(Y-2-8)

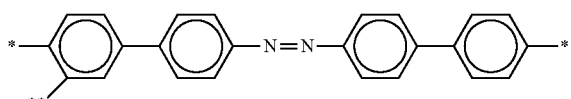
(Y-2-9)

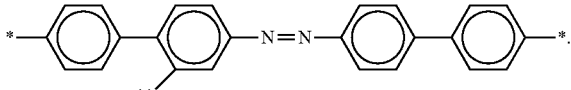
(Y-2-10)

The copolymer is a polymer of the structure represented by the chemical formula (1) and another polymer structure. The other polymer structure is a structure for improving the solubility of the copolymer in the solvent, and is, for example, a polyamide. In particular, preferred is an aromatic polyamide including an aromatic ring.

A liquid crystal alignment agent according to the present invention has high thermal stability and high solvent solubility, so that it enables uniform formation of a film having high heat resistance and high scratch resistance. For this reason, a liquid crystal alignment agent according to the present invention is applicable to, for example, alignment film materials for forming alignment films of liquid crystal panels, and alignment undercoating layers of, for example, coating retardation layers.

Such a coating retardation layer is, for example, a layer of a stack of an alignment undercoating layer subjected to an alignment treatment in a specified direction, and a layer formed of a cured product of a polymerizable liquid crystal (hereafter, also referred to as "reactive mesogenic layer"). The cured polymerizable liquid crystal is aligned in accordance with the alignment direction (defined by the alignment treatment) of the alignment undercoating layer, to provide retardation. In the case of using a liquid crystal alignment agent according to the present invention for the alignment undercoating layer of the coating retardation layer, a retardation layer having high heat resistance can be formed. The alignment undercoating layer can be produced by a method that is not particularly limited, and can be formed by a method similar to a method described later for the alignment films of the liquid crystal panel.

The polymerizable liquid crystal is preferably liquid crystal molecules having a photoreactive group. The liquid crystal molecules having a photoreactive group are, for example, a polymer or oligomer (hereafter, also simply referred to as "polymer") having a side chain having a structure of a combination of a substituent (mesogenic group) such as a biphenyl group, a terphenyl group, a naphthalene group, a phenylbenzoate group, an azobenzene group, or a derivative of the foregoing, and a photoreactive group such as a cinnamoyl group, a chalcone group, a cinnamylidene group, a β-(2-phenyl)acryloyl group, a cinnamic acid group, or a derivative of the foregoing, and a main chain having a structure such as acrylate, methacrylate, maleimide, N-phenylmaleimide, or siloxane. Such a polymer may be a homopolymer constituted by a single repeating unit, or a copolymer constituted by two or more repeating units having different side chain structures. Such copolymers encompass copolymers of, for example, the alternating type, the random type, or the craft, type. In such a copolymer, the side chain of at least one repeating unit may be a side chain having the above-described structure of a combination of a mesogenic group and a photoreactive group, and the side chain of another repeating unit may be a side chain not having such a mesogenic group or a photoreactive group.

The coating retardation layer may be a λ/4 retardation layer. The λ/4 retardation layer preferably imparts an in-plane retardation of ¼ wavelength to at least light of a wavelength of 550 nm, specifically preferably imparts an in-plane retardation of 100 nm or more and 176 nm or less to at least light of a wavelength of 550 nm.

A liquid crystal alignment agent according to the present invention includes, in order to provide improved molecular rigidity, a polymer unit (repeating structure) formed from an imidazole-based compound, an oxazole-based compound, or a thiazole-based compound. The polymer unit formed from the imidazole-based compound, the oxazole-based compound, or the thiazole-based compound corresponds to the structure represented by the chemical formula (1). The structure represented by the chemical formula (1) provides a rigid molecular structure, which is less likely to undergo conformation changes. Thus, in the case of using a liquid crystal alignment agent according to the present invention for forming an alignment film, polymers having relatively low molecular weights are less likely to leach into the liquid crystal layer. Since leaching of impurities into the liquid crystal layer can be suppressed, a liquid crystal panel including an alignment film formed from a liquid crystal alignment agent according to the present invention is less likely to undergo a decrease in the voltage holding ratio even in the case of use under environments at high temperatures for a long period of time, so that occurrence of ghosting and stain can be effectively suppressed.

The structure represented by the chemical formula (1) is rigid, to thereby provide an alignment film having improved film hardness. Liquid crystal panels are sometimes provided with column spacers in order to keep the predetermined thicknesses of liquid crystal layers. The alignment film formed from a liquid crystal alignment agent according to the present invention has high film hardness, and hence is less likely to undergo film separation due to contact with, for example, the column spacers. In addition, the structure represented by the chemical formula (1) has higher planarity than imide rings of polyimide-based alignment films, so that the resultant alignment film has a high degree of alignment to cause liquid crystal molecules adjacent to the alignment film to have a high degree of alignment, to thereby suppress alignment disorder of liquid crystal molecules due to thermal fluctuation. For these reasons, a liquid crystal panel including an alignment film formed from a liquid crystal alignment agent according to the present invention can maintain high contrast even in the case of use under environments at high temperatures for a long period of time.

Furthermore, in the case of using a liquid crystal alignment agent according to the present invention, the polymer has a rigid molecular structure, and is less likely to leach into the liquid crystal layer; thus, the conventional addition of a low-molecular-weight additive is no longer necessary, so that display unevenness due to localization of the low-molecular-weight additive does not occur. In the case of using a liquid crystal alignment agent according to the present invention, compared with the case of adding a low-molecular-weight additive, the alignment film has a uniform resistance value over the whole display surface of the liquid crystal panel, so that display unevenness does not occur, and high contrast can be provided.

On the other hand, a homopolymer including only the structure represented by the chemical formula (1) has low solvent solubility, so that, in the case of using a liquid crystal alignment agent including the homopolymer, a coating film is difficult to form uniformly. When the substrate has regions having no alignment film thereon, alignment of liquid crystal molecules cannot, be controlled in the regions, so that the liquid crystal panel has lower contrast. A liquid crystal alignment agent according to the present invention includes a copolymer including the structure represented by the chemical formula (1), to thereby have high thermal stability and high solvent solubility. A liquid crystal alignment agent according to the present invention has improved solvent solubility, and can be used to form films by printing methods such as an ink jet method.

The alignment film formed from a liquid crystal alignment agent according to the present invention, during no application of voltage of not applying a voltage to the liquid crystal layer constituting the liquid crystal panel, may align liquid crystal molecules in the liquid crystal layer substantially parallel to or substantially perpendicular to the substrate having the alignment film. The "substantially parallel" preferably corresponds to a pretilt angle of 10° or less, more preferably 5° or less, still more preferably 2° or less. From the viewpoint of providing the effect of maintaining good contrast characteristics for a long period of time, 0° is particularly preferred. The "substantially perpendicular" preferably corresponds to a pretilt angle of 83° or more, more preferably 85° or more, still more preferably 88° or more. Incidentally, in this Description, the "pretilt angle" represents the tilt angle of liquid crystal molecules (the angle of the long axes of liquid crystal molecules) relative to a direction parallel to a substrate surface on which the alignment film is formed: the angle corresponding to being parallel to the substrate surface is 0°; and the angle corresponding to a line normal to the substrate surface is 90°.

In this Description, during no application of voltage, among alignment films that align liquid crystal molecules substantially parallel in the liquid crystal layer, an alignment film not including photoreactive moieties in the polymer is referred to as a "homogeneous alignment film", and an alignment film including a photoreactive moiety is referred to as a "homogeneous photo-alignment film". During no application of voltage, among alignment films that align liquid crystal molecules substantially perpendicular in the liquid crystal layer, an alignment film not including photoreactive moieties in the polymer is referred to as a "homeotropic alignment film", and an alignment film including a photoreactive moiety is referred to as a "homeotropic photo-alignment film". In this Description, the "homogeneous alignment film" does not encompass the "homogeneous photo-alignment film". The "homeotropic alignment film" does not encompass the "homeotropic photo-alignment film".

The photoreactive moiety means a structure that can undergo a structural change upon irradiation with light (electromagnetic waves) such as ultraviolet light or visible light. Examples of the structural change of the photoreactive moiety include dimerization (formation of a dimer), isomerization, photo-Fries rearrangement, and decomposition. The structural change of the photoreactive moiety may cause the alignment film to exhibit anchoring strength, or may cause the anchoring strength of the alignment film to change in magnitude and/or direction. The anchoring strength means properties of controlling alignment of liquid crystal molecules present near the alignment film.

A liquid crystal alignment agent according to the present invention may be used as an alignment film material for forming a homogeneous alignment film or for forming a homeotropic alignment film. In the case of using the liquid crystal alignment agent as an alignment film material for forming a homogeneous alignment film or for forming a homeotropic alignment film, the structure represented by the chemical formula (1) preferably does not include photoreactive moieties in X, $Y^1$, and $R^1$ above.

In the case of using the liquid crystal alignment agent as an alignment film material for forming a homogeneous alignment film or for forming a homeotropic alignment film, X above may be any one of the structures represented by the chemical formulas (X-1-1) to (X-1-9). $Y^1$ above may be any one of the structures represented by the chemical formulas (Y-1-1) to (Y-1-16).

In the case of using the liquid crystal alignment agent as an alignment film material for forming a homogeneous alignment film, $R^1$ above is preferably a homogeneous alignment group. The homogeneous alignment group is a functional group that, exhibits an anchoring strength for aligning liquid crystal molecules substantially parallel to the film formed from the liquid crystal alignment agent, and that does t include photoreactive moieties.

The homogeneous alignment group may be any one of structures represented by the following chemical formulas (R-1-1) to (R-1-8).

[Chem. 16]

In the case of using the liquid crystal alignment agent as an alignment film material for forming a homeotropic alignment film, $R^1$ above is preferably a homeotropic alignment group. The homeotropic alignment group is a functional group that exhibits an anchoring strength for aligning liquid crystal molecules substantially perpendicular to the film formed from the liquid crystal alignment agent, and that does not include photoreactive moieties.

The homeotropic alignment group may be any one of structures represented by the following chemical formulas (R-2-1) to (R-2-7).

[Chem. 17]

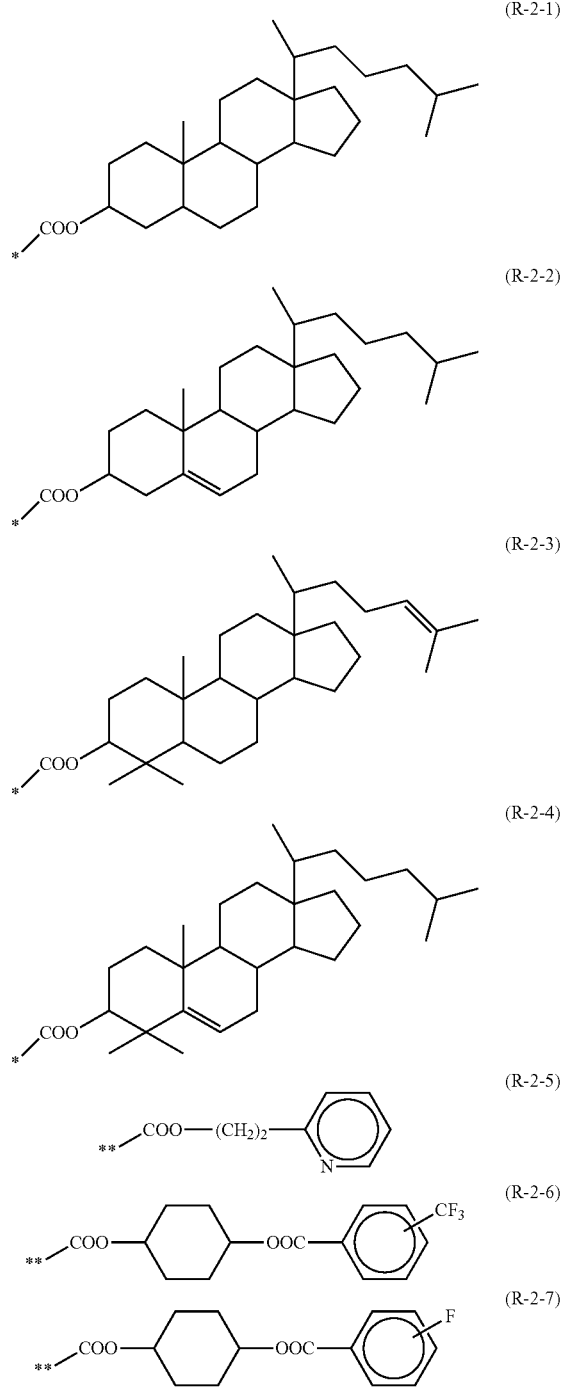

A liquid crystal alignment agent according to the present invention may be used as an alignment film material for forming a homogeneous photo-alignment film or for forming a homeotropic photo-alignment film. In the case of such a photo-alignment film, photoreactive moieties included in the photo-alignment film are inferentially decomposed by, for example, light emitted from a backlight unit, and the polymer partially leaches into the liquid crystal layer due to thermal diffusion, for example. The decomposition products leaching into the liquid crystal layer inferentially cause occurrence of ghosting and stain, liquid crystal alignment agent according to the present invention includes the structure represented by the chemical formula (1), so that, even when photoreactive moieties in the photo-alignment film are photo-decomposed to generate decomposition products, the decomposition products also have high rigidity and are less likely to undergo conformation changes, which enables suppression of leaching into the liquid crystal layer. Thus, even in the case of forming a homogeneous photo-alignment film or a homeotropic photo-alignment film, a liquid crystal panel including such a photo-alignment film enables suppression of a decrease in VHR even in the case of use under environments at high temperatures for a long period of time, to thereby effectively suppress occurrence of ghosting and stain. Incidentally, according to studies performed by the inventors of the present invention, in the homopolymers disclosed in PTL 1 such as a polybenzooxazole-based compound, a polybenzothiazole-based compound, and a polybenzoimidazole-based compound, it is inferentially difficult to control, for example, the amount of a photoreactive functional group introduced, and it is inferentially difficult to provide photo-alignment films having high reliability.

In the case of using the liquid crystal alignment agent as an alignment film material for forming a homogeneous photo-alignment film or for forming a homeotropic photo-alignment film, in the structure represented by the chemical formula (1), at least one of X, $Y^1$, and $R^1$ above includes a photoreactive moiety.

X above may be any one of the structures represented by the chemical formulas (X-2-1) to (X-2-4). $Y^1$ above may be any one of the structures represented by the chemical formulas (Y-2-1) to (Y-2-10). The structures represented by the chemical formulas (X-2-1) to (X-2-4) and the structures represented by the chemical formulas (Y-2-1) to (Y-2-10) each include a photoreactive moiety.

$R^1$ may be a photoreactive functional group. The photoreactive functional group is a functional group including a photoreactive moiety. In this Description, among the photoreactive functional groups, a functional group that exhibits an anchoring strength for aligning liquid crystal molecules substantially parallel to the film formed from the liquid crystal alignment agent is referred to as a homogeneous photo-alignment group. Among the photoreactive functional groups, a functional group that exhibits an anchoring strength for aligning liquid crystal molecules substantially perpendicular to the film formed from the liquid crystal alignment agent is referred to as a homeotropic photo-alignment group.

The photoreactive functional group may be any one of a cinnamate group, a chalcone group, an azobenzene group, a coumarin group, a tolan group, and a stilbene group.

In the case of using the liquid crystal alignment agent as an alignment film material for forming a homogeneous photo-alignment film, $R^1$ above is preferably a homogeneous photo-alignment group. The homogeneous photo-alignment group may be the following chemical formula (R-3-1) or (R-3-2).

[Chem. 18]

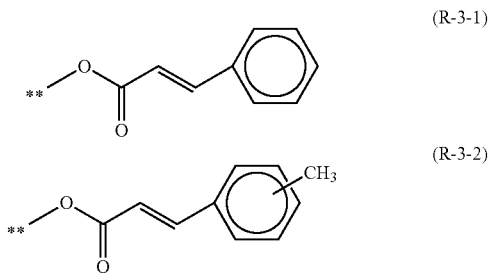

In the case of using the liquid crystal alignment agent as an alignment film material for forming a homeotropic photo-alignment film, $R^1$ above is preferably a homeotropic photo-alignment group. The homeotropic photo-alignment group may be any one of structures represented by the following chemical formulas (R-4-1) to (R-4-21).
[Chem. 19]
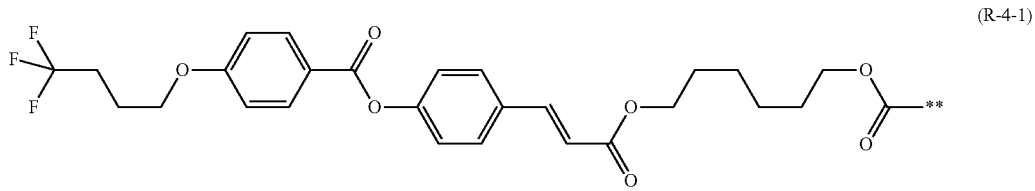
(R-4-1)
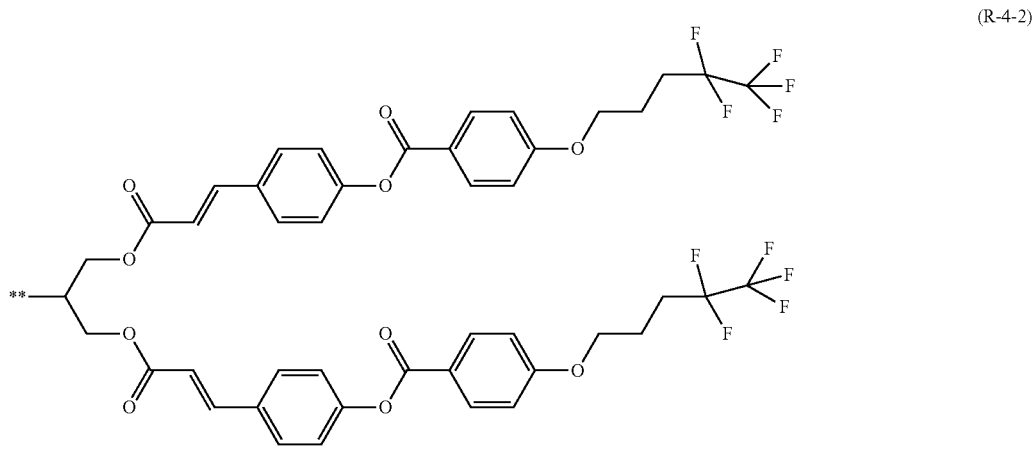
(R-4-2)
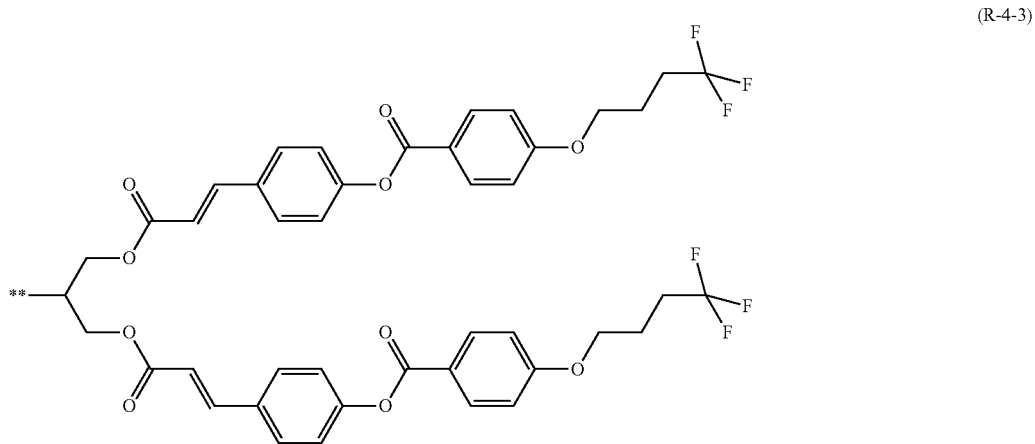
(R-4-3)
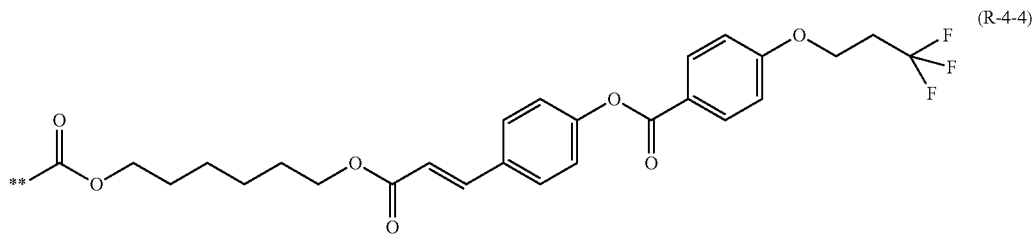
(R-4-4)
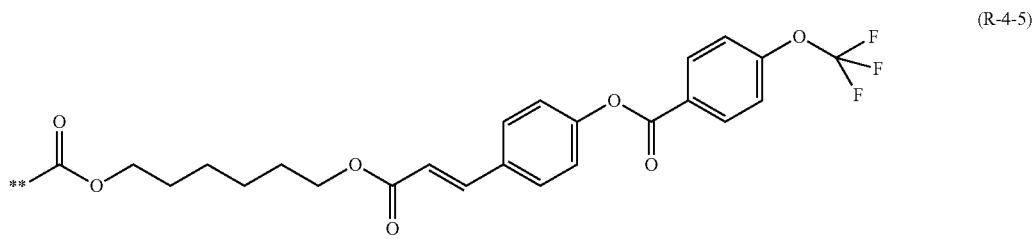
(R-4-5)

[Chem. 20]
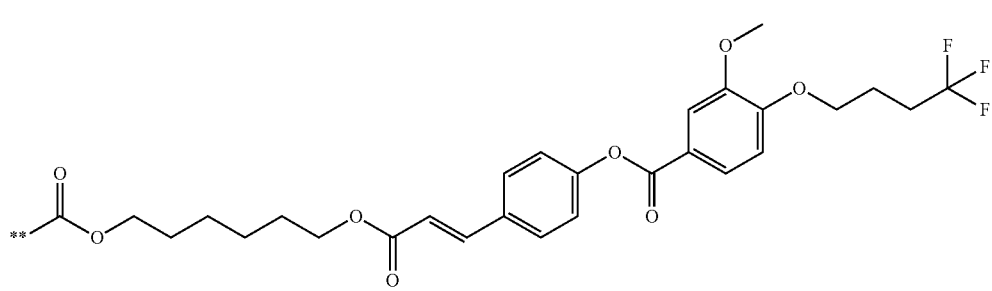
(R-4-6)
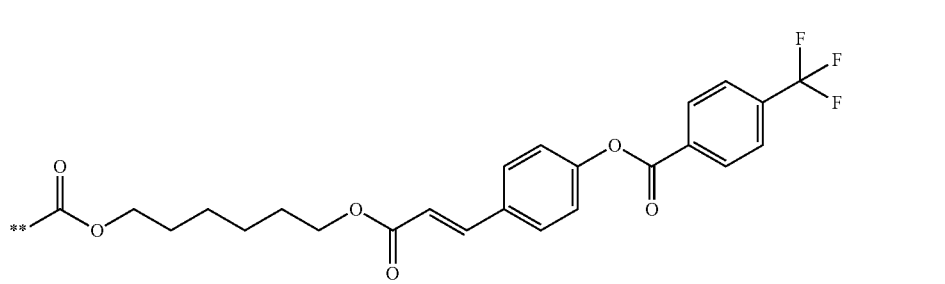
(R-4-7)
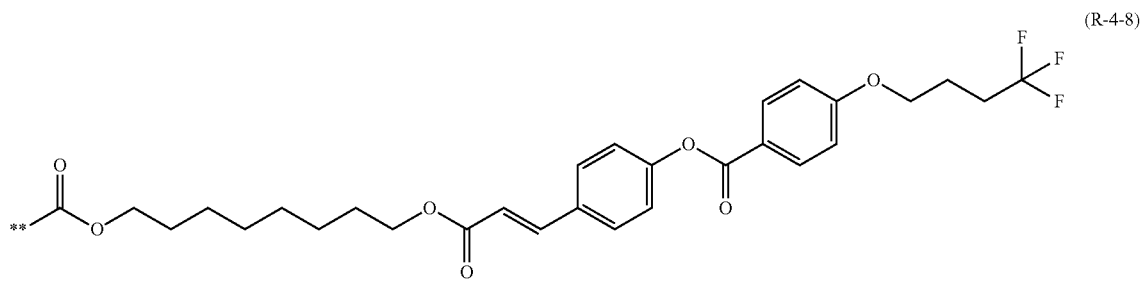
(R-4-8)
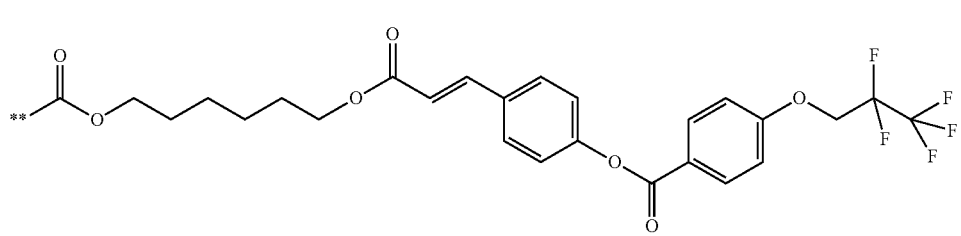
(R-4-9)
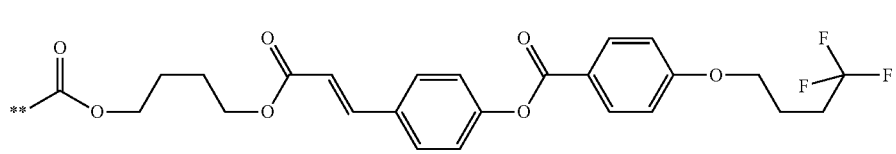
(R-4-10)
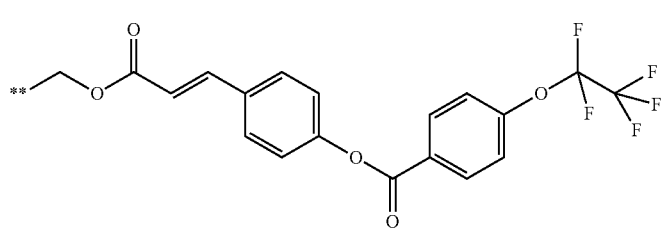
(R-4-11)

[Chem. 21]
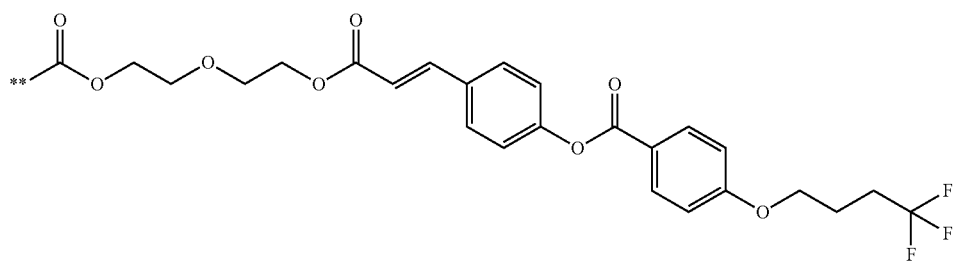
(R-4-12)
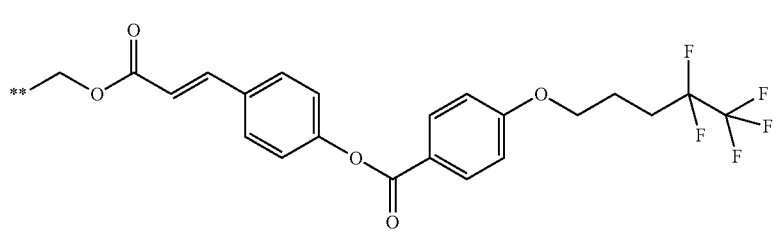
(R-4-13)
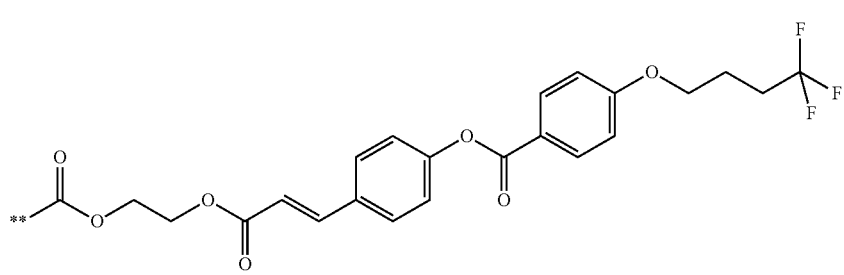
(R-4-14)
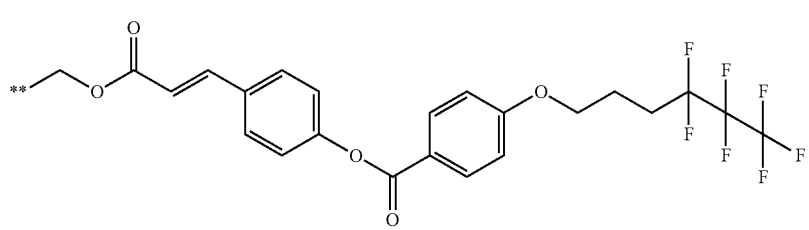
(R-4-15)
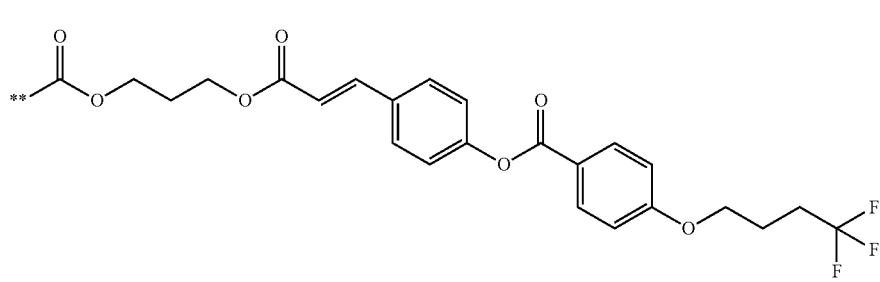
(R-4-16)
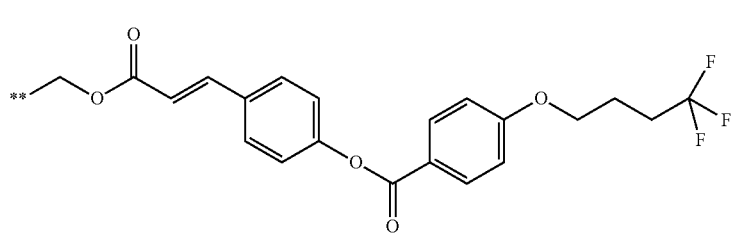
(R-4-17)

[Chem. 22]

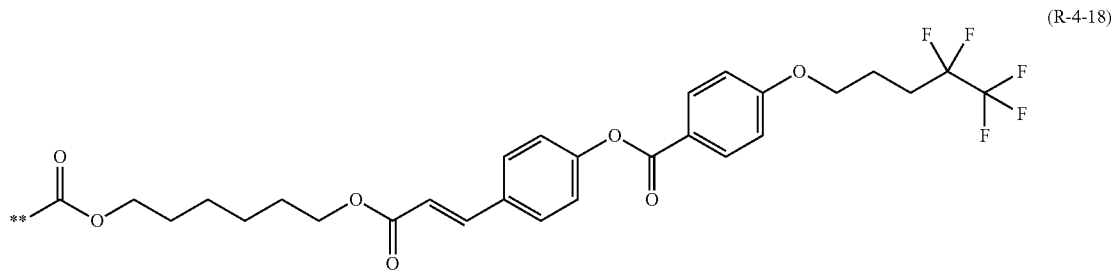
(R-4-18)

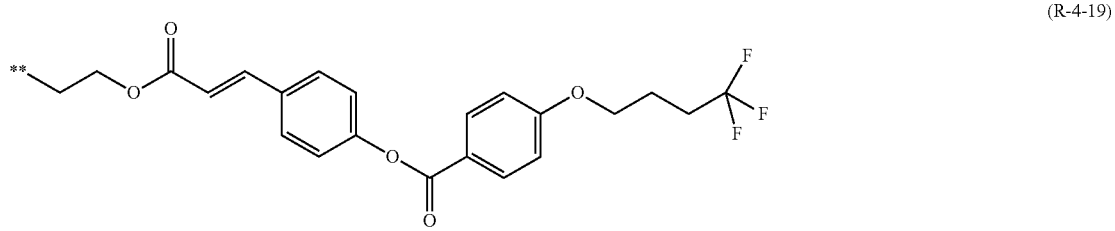
(R-4-19)

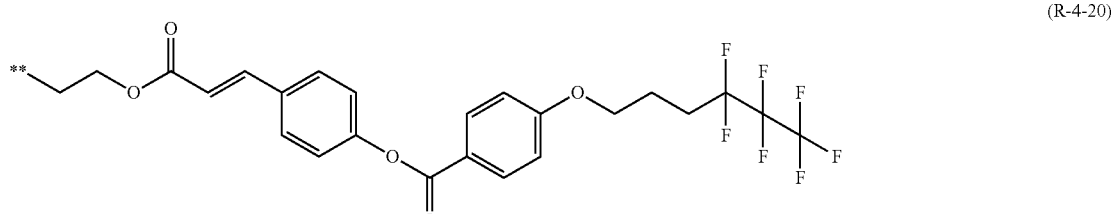
(R-4-20)

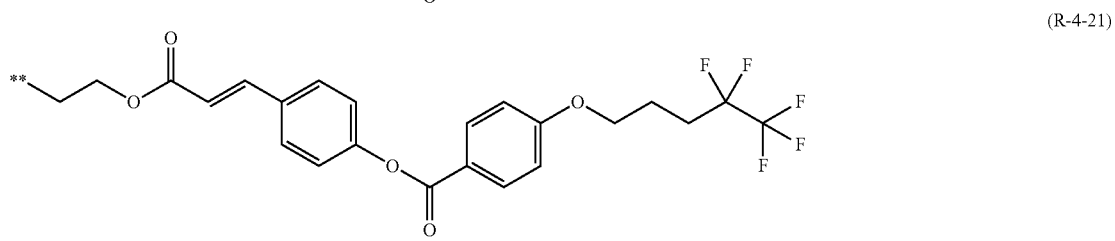
(R-4-21)

The copolymer may be represented by the following chemical formula (2).

[Chem. 23]

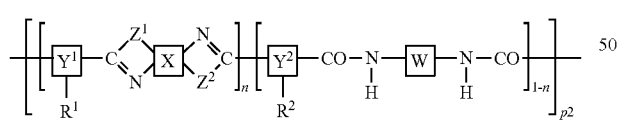
(2)

(where X is any one of the structures represented by the chemical formulas (X-1-1) to (X-1-9), or any one of the structures represented by the chemical formulas (X-2-1) to (X-2-4), $Y^1$ and $Y^2$ are the same or different, and are any one of the structures represented by the chemical formulas (Y-1-1) to (Y-1-16), or any one of the structures represented by the chemical formulas (Y-2-1) to (Y-2-10), $Z^1$ and $Z^2$ are the same or different, and represent an —NH— group, an —O— group, or a —S— group, $R^1$ and $R^2$ are the same or different, and represent a homogeneous alignment group, a homeotropic alignment group, or a photoreactive functional group, W is any one of structures represented by the following chemical formulas (W-1-1) to (W-1-11), or any one of structures represented by the following chemical formulas (W-2-1) to (W-2-5), n is a real number of more than 0 and less than 1, and $p^2$ represents a repeat number, and is an integer of 1 or more.)

[Chem. 24]

(W-1-1)

(W-1-2)

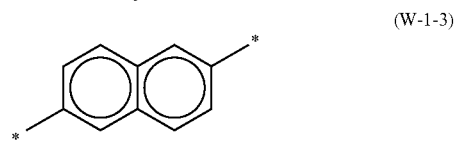
(W-1-3)

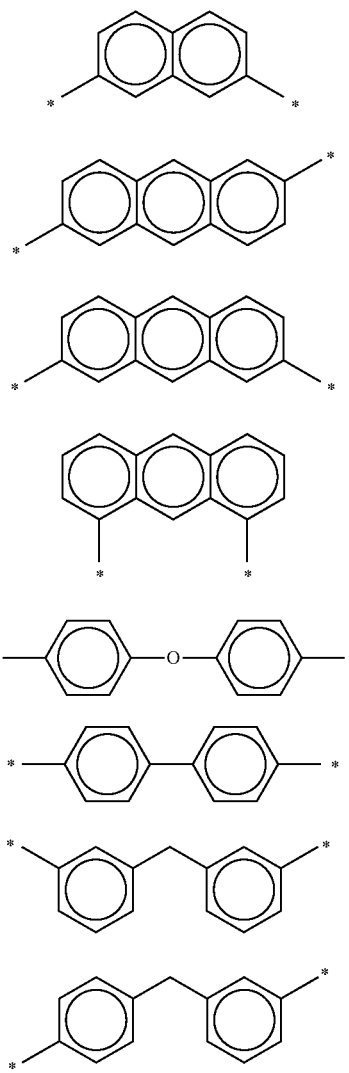

[Chem. 25]

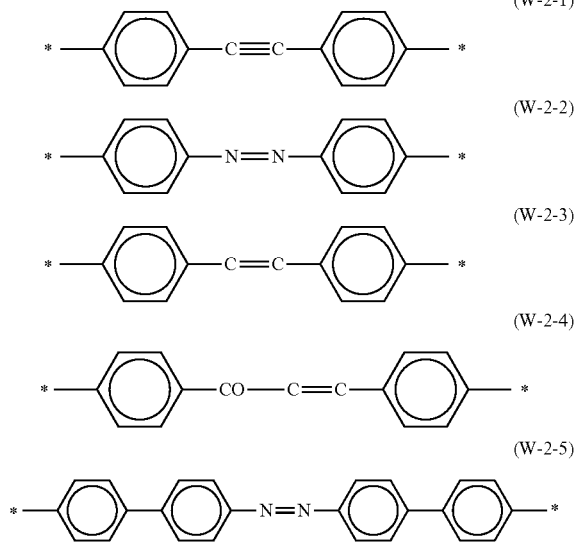

In the case of using the liquid crystal alignment agent as an alignment film material for forming a homogeneous alignment film or for forming a homeotropic alignment film, in the structure represented by the chemical formula (2), X, $Y^1$, $Y^2$, W, $R^1$, and $R^2$ above preferably do not include photoreactive moieties.

In the case of using the liquid crystal alignment agent as an alignment film material for forming a homogeneous alignment film or for forming a homeotropic alignment film, $Y^1$ and $Y^2$ above may be the same or different, and may be any one of the structures represented by the chemical formulas (Y-1-1) to (Y-1-16). At least, one of $R^1$ and $R^2$ above may be the homogeneous alignment group or the homeotropic alignment group. W above may be any one of the structures represented by the chemical formulas (W-1-1) to (W-1-11).

In the case of using the liquid crystal alignment agent as an alignment film material for forming a homogeneous photo-alignment film or for forming a homeotropic photo-alignment film, in the structure represented by the chemical formula (2), at least one of X, $Y^1$, $Y^2$, W, $R^1$, and $R^2$ above includes a photoreactive moiety.

In the case of using the liquid crystal alignment agent as an alignment film material for forming a homogeneous photo-alignment film or for forming a homeotropic photo alignment film, $Y^1$ and $Y^2$ above may be the same or different, and may be any one of the structures represented by the chemical formulas (Y-2-1) to (Y-2-10). At least one of $R^1$ and $R^2$ above may be the photoreactive functional group. W above may be any one of the structures represented by the chemical formulas (W-2-1) to (W-2-5). The structures represented by the chemical formulas (W-2-1) to (W-2-5) each include a photoreactive moiety.

The solvent is not particularly limited, and may be a solvent commonly used for a liquid crystal alignment agent. Examples of the solvent include N,N-dimethylformamide, N,N-dimethylacetamide, N-methyl-2-pyrrolidone, N-ethyl-2-pyrrolidone, N-methylcaprolactam, dimethyl sulfoxide, tetramethylurea, pyridine, dimethyl sulfone, hexamethylsulfoxide, γ-butyrolactone, isopropyl alcohol, methoxymethylpentanol, dipentene, ethyl amyl ketone, methyl nonyl ketone, methyl ethyl ketone, methyl isoamyl ketone, methyl isopropyl ketone, methyl cellosolve, ethyl cellosolve, methyl cellosolve acetate, ethyl cellosolve acetate, butylcarbitol, ethylcarbitol, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxybutanol, diisopropyl ether, ethyl isobutyl ether, diisobutylene, amyl acetate, butyl butyrate, butyl ether, diisobutyl ketone, methylcyclohexene, propyl ether, dihexyl ether, dioxane, n-hexane, n-pentane, n-octane, diethyl ether, cyclohexanone, ethylene carbonate, propylene carbonate, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl 3-methoxypropionate, diglyme, 4-hydroxy-4-methyl-2-pentanone, 3-methoxy-N,N-dimethylpropanamide, 3-ethoxy-N,N-dimethylpropanamide, and 3-butoxy-N,N-dimethylpropanamide. These solvents may be used alone or in combination thereof. Of these, for example, γ-butyrolactone, N-methyl-2-pyrrolidone, or a mixture of these is preferably used.

The copolymer is synthesized by, for example, a method including a first reaction step of causing a reaction between, in a solvent, a compound including any one of the structures represented by the chemical formulas (X-1-1) to (X-1-9) or any one of the structures represented by the chemical formulas (X-2-1) to (X-2-4), and a compound including any one of the structures represented by the chemical formulas (W-1-1) to (W-1-11) or any one of the structures represented by the chemical formulas (W-2-1) to (W-2-5) to obtain a reaction solution, and a second reaction step of further adding, to the reaction solution, a compound including any one of the structures represented by the chemical formulas (Y-1-1) to (Y-1-16) or any one of the structures represented by the chemical formulas (Y-2-1) to (Y-2-10) to cause a reaction.

The compound including any one of the structures represented by the chemical formulas (X-1-1) to (X-1-9) or any one of the structures represented by the chemical formulas (X-2-1) to (X-2-4) is preferably, for example, a compound in which, in the chemical formula, $-NH_2$ bond to at least two points of bonding among four points, and $-NH_2$, $-OH$, or $-SH$ bond to the remaining two points. Specific examples include a tetraamine compound having four $-NH_2$ groups, a tetrahydroxyl compound having four $-OH$ groups, and a tetrathiol compound having four $-SH$ groups.

The compound including any one of the structures represented by the chemical formulas (W-1-1) to (W-1-11) or any one of the structures represented by the chemical formulas (W-2-1) to (W-2-5) is preferably, for example, a compound in which, in the chemical formula, for example, $-NH_2$ bond to two points of bonding. Specific examples include diamine compounds.

The compound including any one of the structures represented by the chemical formulas (Y-1-1) to (Y-1-16) or any one of the structures represented by the chemical formulas (Y-2-1) to (Y-2-10) is preferably, for example, a compound in which, in the chemical formula, for example, $-COOH$ or $-COCl$ bond to two points of bonding. Specific examples include dicarboxylic acid compounds and dicarboxylic chlorides.

The solvent may be the above-described solvent. The solvent used in the first reaction step and the second reaction step may be employed as the solvent of the liquid crystal alignment agent; alternatively, after the synthesis of the copolymer, the reaction solvent may be replaced by another solvent used as the solvent of the liquid crystal alignment agent.

The first reaction step and the second reaction step may be performed by heating, for example. After the second reaction step, furthermore, acetylation is preferably performed. The method of performing the acetylation is not particularly limited; examples of the method include a method of using an acetylation agent such as acetic anhydride, and using a catalyst such as pyridine or pyrimidine.

Embodiment 2

[Liquid Crystal Panel]

Hereinafter, referring to FIG. 1, the configuration of a liquid crystal panel according to Embodiment 2 will be described. FIG. 1 is a sectional view schematically illustrating an example of the liquid crystal panel according to Embodiment 2. As illustrated in FIG. 1, a liquid crystal panel 100 includes pair of substrates 10 and 20, a liquid crystal layer 30 held between the pair of substrates 10 and 20, and an alignment film 40 disposed between at least one of the pair of substrates 10 and 20 and the liquid crystal layer 30. The pair of substrates 10 and 20 may be bonded together with a sealing material 60.

The pair of substrates 10 and 20 may be, for example, a combination of an active matrix substrate (TFT substrate) and a color filter (CF) substrate. Alternatively, in the pair of substrates 10 and 20, both of the color filter and the active matrix may be formed on one of the substrates.

The active matrix substrate may be one that is ordinarily used in the field of liquid crystal panels. The active matrix substrate may have a configuration including, for example, in plan view, on a transparent substrate, a plurality of parallel gate signal lines; a plurality of source signal lines formed so as to extend in a direction orthogonal to the gate signal lines and be parallel to each other; active devices such as thin film transistors (TFT) disposed so as to correspond to intersections of the gate signal lines and the source signal lines; and pixel electrodes disposed in a matrix in regions (subpixels) defined by the gate signal lines and the source signal lines. In the case of a homogeneous alignment mode such as an FFS mode or an IPS mode, furthermore, for example, common wiring and a counter electrode connected to the common wiring are disposed.

The color filter substrate may be one that is ordinarily used in the field of liquid crystal panels. The color filter substrate may have a configuration in which, for example, on a transparent substrate, a black matrix formed in a grid pattern and color filters formed within quadrangle regions, namely pixels, are disposed.

The liquid crystal layer 30 is not particularly limited as long as it is a layer containing at least one liquid crystal material. The liquid crystal material may be one that is ordinarily used in the field of liquid crystal panels. The liquid crystal material may have a dielectric constant anisotropy (Δε) (defined by the following formula) of a negative value or a positive value. A liquid crystal material having a negative dielectric constant anisotropy (negative liquid crystal material) may have a Δε of −1 to −20, for example. A liquid crystal material having a positive dielectric constant anisotropy (positive liquid crystal material) may have a Δε of 1 to 20, for example. The liquid crystal layer 30 may further contain a liquid crystal material that does not have polarity, specifically has a Δε of substantially 0 (neutral liquid crystal molecules).

$$\Delta\varepsilon=(\text{dielectric constant in long-axis direction of liquid crystal molecules})-(\text{dielectric constant in short-axis direction of liquid crystal molecules})$$

The alignment film 40 controls alignment of liquid crystal molecules included in the liquid crystal layer 30 in a state of no application of voltage to the liquid crystal layer 30 (the state encompasses a state of application of a voltage of less than the threshold value of liquid crystal molecules). During no application of voltage, the alignment film 40 may align liquid crystal molecules substantially parallel in the liquid crystal layer 30, or may align liquid crystal molecules substantially perpendicular in the liquid crystal layer 30. The alignment film 40 may be a homogeneous alignment film, a homeotropic alignment film, a homogeneous photo-alignment film, or a homeotropic photo-alignment film.

The alignment film 40 includes a structure derived from a copolymer including a structure represented by the following chemical formula (1). The alignment film 40 is a crosslinked copolymer including the structure represented by the following chemical formula (1).

[Chem. 26]

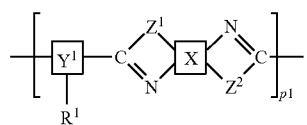

(1)

(where X is any one of the structures represented by the chemical formulas (X-1-1) to (X-1-9), or any one of the structures represented by the chemical formulas (X-2-1) to (X-2-4), $Y^1$ is any one of the structures represented by the chemical formulas (Y-1-1) to (Y-1-16), or any one of the structures represented by the chemical formulas (Y-2-1) to (Y-2-10), $Z^1$ and $Z^2$ are the same or different, and represent an —NH— group, an —O— group, or a —S— group, $R^1$ represents a homogeneous alignment group, a homeotropic alignment group, or a photoreactive functional group, and $p^1$ represents a repeat number, and is an integer of 1 or more.)

The structure derived from the copolymer at least maintains a structure in which, in the chemical formula (1) or the following chemical formula (2), $Z^1$ and $Z^2$ are the same or different, and are an —NH— group, an —O— group, or a —S— group.

The copolymer included in the liquid crystal alignment agent for forming a homeotropic alignment film or for forming a homogeneous alignment film has no photoreactive moieties, hence does not undergo, for example, decomposition due to photo-alignment treatment. Thus, when the alignment film 40 is a homeotropic alignment film or a homogeneous alignment film, the structure derived from the copolymer including the structure represented by the chemical formula (1) or the following chemical formula (2) in the alignment film 40 is the same as the copolymer including the structure represented by the chemical formula (1) or the following chemical formula (2) in the liquid crystal alignment agent.

On the other hand, the copolymer included in the liquid crystal alignment agent for forming a homeotropic photo-alignment film or for forming a homogeneous photo-alignment film has, in at least one of the main chain (X, $Y^1$, $Y^2$, W) and side chains ($R^1$ and $R^1$), a photoreactive moiety, and hence may undergo, depending on the species of the photoreactive moiety, for example, decomposition due to photo-alignment treatment. Thus, when the alignment film 40 is a homeotropic photo-alignment film or a homogeneous photo-alignment film, the structure derived from the copolymer including the structure represented by the chemical formula (1) or the following chemical formula (2) in the alignment film 40 may be different in the structure of the photoreactive moiety from the copolymer including the structure represented by the chemical formula (1) or the following chemical formula (2) in the liquid crystal alignment agent. Even in such a case, when the alignment film 40 includes a structure in which, in the chemical formula (1) or the following chemical formula (2), $Z^1$ and $Z^2$ are the same or different, and are an —NH— group, an —O— group, or a —S— group, advantages of the present invention can be provided.

The copolymer may be represented by the following chemical formula (2).

[Chem. 27]

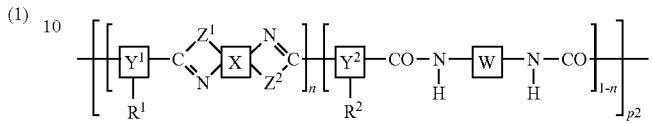

(2)

(where X is any one of the structures represented by the chemical formulas (X-1-1) to (X-1-9), or any one of the structures represented by the chemical formulas (X-2-1) to (X-2-4), $Y^1$ and $Y^2$ are the same or different, and are any one of the structures represented by the chemical formulas (Y-1-1) to (Y-1-16), or any one of the structures represented by the chemical formulas (Y-2-1) to (Y-2-10), $Z^1$ and $Z^2$ are the same or different, and represent an —NH— group, an —O— group, or a —S— group, $R^1$ and $R^2$ are the same or different, and represent a homogeneous alignment group, a homeotropic alignment group, or a photoreactive functional group, W is any one of the structures represented by the chemical formulas (W-1-1) to (W-1-11), or any one of the structures represented by the chemical formulas (W-2-1) to (W-2-5), n is a real number of more than 0 and less than 1, and $p^2$ represents a repeat number, and is an integer of 1 or more.)

Regarding the chemical formulas (1) and (2), as in the above-described liquid crystal alignment agent, the following features (A) to (Q) are applicable to a liquid crystal panel according to the present invention:

(A) X above may be any one of the structures represented by the chemical formulas (X-1-1) to (X-1-9);

(B) X above may be any one of the structures represented by the chemical formulas (X-2-1) to (X-2-4);

(C) $Y^1$ above may be any one of the structures represented by the chemical formulas (Y-1-1) to (Y-1-16);

(D) $Y^1$ above may be any one of the structures represented by the chemical formulas (Y-2-1) to (Y-2-10);

(E) the photoreactive functional group may be any one of a cinnamate group, a chalcone group, an azobenzene group, a coumarin group, a tolan group, and a stilbene group;

(F) the homogeneous alignment group may be any one of the structures represented by the chemical formulas (R-1-1) to (R-1-8);

(G) the homeotropic alignment group may be any one of the structures represented by the chemical formulas (R-2-1) to (R-2-7);

(H) the homogeneous alignment group may be any one of the structures represented by the chemical formulas (R-1-1) to (R-1-8);

(I) the homeotropic alignment group may be any one of the structures represented by the chemical formulas (R-2-1) to (R-2-7);

(J) the homogeneous photo-alignment group may be the structure represented by the chemical formula (R-3-1) or (R-3-2);

(K) the homeotropic photo-alignment group may be any one of the structures represented by the chemical formulas (R-4-1) to (R-4-21);

(L) at least one of $R^1$ and $R^2$ above may be the photoreactive functional group;

(M) at least one of $R^1$ and $R^2$ above may be the homogeneous alignment group or the homeotropic alignment group;

(N) $Y^1$ and $Y^2$ above may be the same or different, and may be any one of the structures represented by the chemical formulas (Y-1-1) to (Y-1-16);

(O) $Y^1$ and $Y^2$ above may be the same or different, and may be any one of the structures represented by the chemical formulas (Y-2-1) to (Y-2-10);

(P) W above may be any one of the structures represented by the chemical formulas (W-1-1) to (W-1-11); and (Q) W above may be any one of the structures represented by the chemical formulas (W-2-1) to (W-2-5).

On the opposite sides of the pair of substrates 10 and 20 from the liquid crystal layer 30, polarizing plates (linear polarizers) 70 may be disposed. Such a polarizing plate 70 is typically produced by causing an anisotropic material such as iodine to adsorb onto polyvinyl alcohol (PVA), and drawing it so as to have a sheet shape. In general, for practical use, both surfaces of the PVA sheet are laminated with protective films such as triacetyl cellulose films. Optical films such as retardation layers may be disposed between the polarizing plates 70 and the pair of substrates 10 and 20. The retardation layers may be coating retardation layers in which a liquid crystal alignment agent according to the present invention is used for alignment undercoating layers.

[Method for Producing Liquid Crystal Panel]

The method for producing the liquid crystal panel is not particularly limited, but may include, for example, a step of applying, onto the surfaces of the pair of substrates, a liquid crystal alignment agent according to the present invention to form coating films, and a step of subjecting the coating films to alignment treatment, to form alignment films.

In the step of forming coating films, examples of the coating method include a roll coater method, a spinner method, a printing method, and an ink jet method. A liquid crystal alignment agent according to the present invention has high solvent solubility, and hence can be applied by an ink jet method. The use of the ink jet method enables formation of a film having a large area at standard pressure, which facilitates the production.

The alignment treatment for a homogeneous alignment film and a homeotropic alignment film is preferably a rubbing method. For a homogeneous photo-alignment film and a homeotropic photo-alignment film, a photo-alignment method is preferably used.

The photo-alignment method is, for example, a method of irradiating, with light, a coating film formed from the liquid crystal alignment agent. The light used in the photo-alignment method may be light (electromagnetic waves) such as ultraviolet light or visible light, but preferably has a wavelength of 250 nm to 400 nm. When the wavelength is 250 to 400 nm, the material that exhibits photo-alignment properties and constitutes the photo-alignment film undergoes a structural change, to exhibit anchoring strength. The light used in the photo-alignment method is, for example, linearly polarized ultraviolet radiation.

The dose of the light preferably has a lower limit of 0.1 $mJ/cm^2$, and preferably has an upper limit of 5 $J/cm^2$. The dose of the light more preferably has a lower limit of 1 $mJ/cm^2$, more preferably has an upper limit of 3 $J/cm^2$, still more preferably has a lower limit of 10 $mJ/cm^2$, still more preferably has an upper limit of 1 $J/cm^2$, and particularly preferably has an upper limit of 500 $mJ/cm^2$.

Furthermore, between the step of forming the coating films and the alignment treatment step, a step of heating the coating films may be performed. The heating may be performed by a two-stage process of preliminary firing and main firing. Alternatively, before and after the alignment treatment step, preliminary firing and main firing may be performed.

After the step of forming the alignment films, a step of forming a liquid crystal layer between the alignment films formed on the pair of substrates may be performed. The step of forming the liquid crystal layer may be performed by a method of coating any one of the pair of substrates with a sealing material, dropping a liquid crystal composition in a region surrounded by the sealing material, and subsequently bonding together the substrate and the other substrate; or a method of bonding together the pair of substrates with a sealing material, and subsequently filling the pair of substrates with a liquid crystal composition. After the step of forming the liquid crystal layer, in order to turn liquid crystal molecules into an isotropic phase, a re-alignment treatment may be performed.

Embodiment 3

[Liquid Crystal Display Apparatus]

Another embodiment according to the present invention may be a liquid crystal display apparatus including a liquid crystal panel according to the present invention. The liquid crystal display apparatus includes a backlight unit on, for example, the back surface of any one of the pair of substrates 10 and 20 of the liquid crystal panel.

The backlight unit may be one ordinarily used in the field of liquid crystal display apparatuses. The backlight unit is not particularly limited as long as it emits light including visible light, and may be a backlight unit that emits light including visible light alone or may be a backlight unit that emits light including both of visible light and ultraviolet light. In order to provide a liquid crystal display apparatus that displays color images, the backlight unit preferably emits white light. The light source of a backlight 80 is preferably, for example, a light-emitting diode (LED). Incidentally, in this Description, "visible light" means light (electromagnetic waves) of a wavelength of 380 nm or more and less than 800 nm.

The display mode is not particularly limited. For example, the liquid crystal display apparatus may be an IPS (In Plane Switching) mode, an FFS (Fringe Field Switching) mode, a VA (Vertical Alignment) mode, an electrically controlled birefringene (ECB) mode, an RTN (Reverse Twisted Nematic) mode, or a CPA (Continuous Pinwheel Alignment) mode.

In the IPS mode and the FFS mode, at least one of the substrates 10 and 20 is provided with pixel electrodes and a common electrode. During no application of voltage, liquid crystal molecules are aligned substantially parallel to the alignment film. A horizontal electric field or fringe electric field formed between the pixel electrodes and the common electrode changes the alignment of the liquid crystal molecules to thereby perform displaying. The liquid crystal material may be of a negative type or a positive type.

In the VA mode, RTN mode, CPA mode, and FOB mode, one of the substrates 10 and 20 has pixel electrodes, and the other has a common electrode. During no application of voltage, in the VA mode, RTN mode, and CPA mode, liquid crystal molecules are aligned substantially perpendicular to the alignment film. On the other hand, during no application of voltage, in the BCE mode, liquid crystal molecules are aligned substantially parallel to the alignment film. In the VA mode, RTN mode, CPA mode, and ECB mode, during application of voltage, a vertical electric field formed between the pixel electrodes and the common electrode changes the alignment of the liquid crystal molecules to thereby perform displaying.

Specifically, in the VA mode, during application of voltage, the vertical electric field formed in the liquid crystal layer may be used to tilt liquid crystal molecules to thereby perform displaying. In at least one of the pixel electrodes and the counter electrode, an opening may be formed. The liquid crystal material may be a negative liquid crystal.

In the RTN mode, for example, alignment films may individually formed on the substrates 10 and 20 such that, during no application of voltage, the alignment directions of liquid crystal molecules are substantially orthogonal to each other. In at least one of the pixel electrodes and the counter electrode, an opening may be formed. The liquid crystal material may be a negative liquid crystal.

In the CPA mode, for example, a plurality of pixel electrodes may be provided for each of subpixels. During application of voltage, an oblique electric field is formed between the edges of the pixel electrodes and the counter electrode, to radially tilt liquid crystal molecules toward the centers of the pixel electrodes to thereby perform displaying. The liquid crystal material may be a negative liquid crystal.

The ECB mode is a display mode that employs a nematic liquid crystal having a positive dielectric anisotropy and that uses the birefringence. Voltage is applied to change the retardation of the liquid crystal layer to thereby perform displaying.

In the VA mode, RTN mode, and CPA mode, during no application of voltage to the liquid crystal layer, liquid crystal molecules adjacent to the alignment film are aligned substantially perpendicular to the alignment film. Thus, the liquid crystal panel used for a liquid crystal display apparatus of such an alignment mode preferably includes, as an alignment film, a homeotropic alignment film or a homeotropic photo-alignment film. Regarding the RTN mode, a mode using a photo-alignment film is also referred to as a UV2A (Ultra Violet Induced Vertical Alignment) mode. In the UV2A mode, ultraviolet radiation is applied to perform alignment treatment. The liquid crystal panel used for a liquid crystal display apparatus of the UV2A mode preferably includes a homeotropic photo-alignment film.

On the other hand, in the IPS mode, FFS mode, and ECB mode, during no application of voltage to the liquid crystal layer, liquid crystal molecules adjacent to the alignment film are aligned substantially parallel to the alignment film. Thus, the liquid crystal panel used for a liquid crystal display apparatus of the IPS mode, FFS mode, or ECB mode preferably includes, as an alignment film, a homogeneous alignment film or a homogeneous photo-alignment film.

In the display mode in which, during no application of voltage, liquid crystal molecules are aligned substantially parallel, the anchoring strength of the alignment film is necessary to align liquid crystal molecules substantially parallel to the substrate, so that an alignment film that exhibits a high anchoring strength is preferably used. The alignment film formed from a liquid crystal alignment agent according to the present invention has such a high degree of alignment that it sufficiently controls the alignment of liquid crystal molecules adjacent to the alignment film, and hence is also suitably used as a homogeneous alignment film or a homogeneous photo-alignment film. Use of a homogeneous alignment film or a homogeneous photo-alignment film formed from a liquid crystal alignment agent according to the present invention enables maintaining of a long-term reliability of the IPS mode or FFS mode liquid crystal display apparatus. Furthermore, in the IPS mode or FFS mode liquid crystal display apparatus, use of, as a liquid crystal material, a negative liquid crystal material, provides an even higher contrast of the liquid crystal display apparatus.

Embodiments according to the present invention have been described so far. All of the described features are individually applicable to the entirety of the present invention.

Hereinafter, the present invention will be described further in detail with reference to Examples and Comparative Examples. However, the present invention is not limited to these Examples.

<Synthesis of Liquid Crystal Alignment Agent for Forming Homogeneous Alignment Film>

Example 1-1

A tetraamine compound (0.08 mol) represented by the following chemical formula (3), and 0.02 mol of a diamine compound represented by the following chemical formula (4) were dissolved in γ-butyrolactone. Subsequently, as a dicarboxylic acid compound, 0.10 mol of terephthalic acid represented by the following chemical formula (5) was added, to cause a reaction at 80° C. for 12 hours, to obtain a solution including a copolymer precursor (n=0.8).

[Chem. 28]

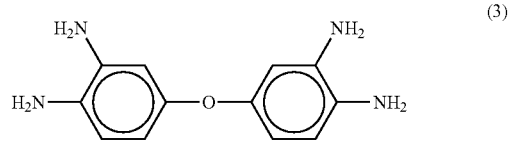

(3)

[Chem. 29]

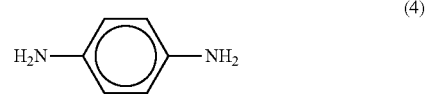

(4)

[Chem. 30]

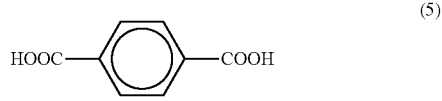

(5)

Subsequently, to a mixture of γ-butyrolactone and N-methyl-2-pyrrolidone (NMP), an excess of pyridine (0.5 mol) and acetic anhydride (0.3 mol) were added, and, in this state, a reaction was caused at 150° C. for 3 hours. This provided a liquid crystal alignment agent including, as the solvent, a mixture of γ-butyrolactone and NMP, and a copolymer including a structure represented by the following chemical formula (6).

[Chem. 31]

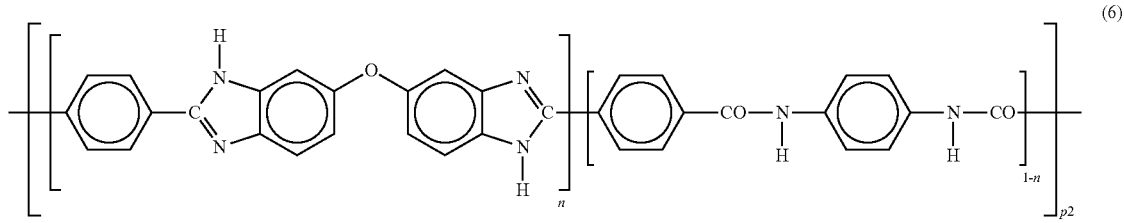

(6)

The copolymer including the structure represented by the chemical formula (6) was a copolymer represented by the following chemical formula (2) where X was a structure represented by the following chemical formula (X-1-8), $Y^1$ and $Y^2$ were structures represented by the following chemical formula (Y-1-1) or the following chemical formula (Y-1-2). W is a structure represented by the following chemical formula (W-1-1), $Z^1$ and $Z^2$ were —NH— groups, $R^1$ and $R^2$ were —H (the chemical formula (R-1-1)), and n=0.8.

[Chem. 32]

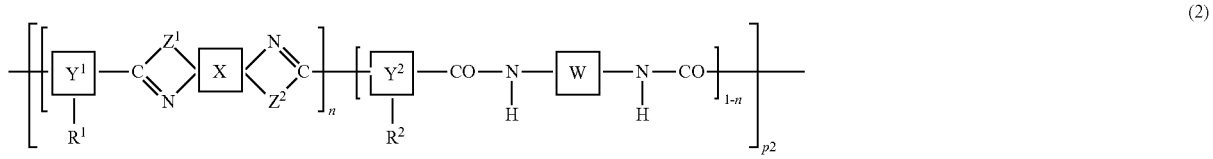

(2)

[Chem. 33]

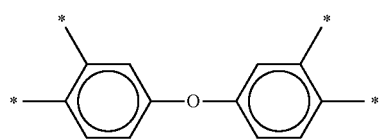

(X-1-8)

[Chem. 34]

(Y-1-1)

[Chem. 35]

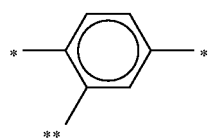

(Y-1-2)

[Chem. 36]

(W-1-1)

Example 1-2, Example 1-3, Comparative Example 1-1, and Comparative Example 1-2

Synthesis was performed as in Example 1-1 except for, in the step of preparing the precursor, changes in the mixing ratio of the tetraamine compound represented by the chemical formula (3) to the diamine compound represented by the chemical formula (4): in the chemical formula (2), n was set to 0.5 in Example 1-2, n was set to 0.2 in Example 1-3, n was set to 0 in Comparative Example 1-1, and n was set to 1 in Comparative Example 1-2. In Comparative Example 1-1, the tetraamine compound was not added, but the diamine compound represented by the chemical formula (4) alone was added to provide a homopolymer. In Comparative Example 1-2, the diamine compound was not added, but the tetraamine compound represented by the chemical formula (3) alone was added to provide a homopolymer.

<Production of Liquid Crystal Panels>

The liquid crystal alignment agents of the above-described Examples 1-1 to 1-3 and Comparative Examples 1-1 and 1-2 were used to produce FFS-mode liquid crystal panels by the following method.

A substrate including an ITO (Indium Tin Oxide) electrode having an opening (slit) and having an FFS-mode electrode structure, and a substrate not including electrodes were prepared. Such a liquid crystal alignment agent was applied to the pair of substrates, and subjected to preliminary firing at 90° C. for 5 minutes, subsequently to main firing at 230° C. for 40 minutes. The liquid crystal alignment agent was applied by a spin coating method. The surfaces of the homogeneous alignment films formed on the pair of substrates were rubbed to thereby perform alignment treatment.

Subsequently, on one of the substrates, a dispenser was used to form a pattern with an ultraviolet-curable sealing agent (manufactured by SEKISUI CHEMICAL CO., LTD., trade name: Photolec S-WB). To a predetermined position on the other substrate, a liquid crystal composition containing a positive liquid crystal material having a positive dielectric constant anisotropy was dropped. Subsequently, both of the substrates were bonded together in a vacuum, and irradiated with ultraviolet light to cure the sealing agent. Subsequently, in order to eliminate flow-induced alignment of liquid crystal molecules, the liquid crystal cell was heated at 130° C. for 40 minutes, to thereby perform re-alignment treatment for bringing the liquid crystal molecules into an isotropic phase. Subsequently, cooling to room temperature was performed to obtain an FFS-mode liquid crystal panel.

<High-Temperature Test on Backlight>

In order to evaluate the heat resistance of the liquid crystal panels in which alignment films were formed from the liquid crystal alignment agents of the above-described Examples 1-1 to 1-3 and Comparative Examples 1-1 and 1-2, a high-temperature test, was performed: on a backlight turned on, such a liquid crystal cell was disposed, and, while the liquid crystal cell was heated to a temperature of 75° C., it was left for 500 hours. Before and after the high-temperature test, measurement was performed for voltage holding ratio (VHR) and contrast. The results are described in the following Table 1. Incidentally, the VHR was measured with a 6254 VHR measurement system manufactured by TOYO Corporation under conditions of 1 V and 70° C. The contrast was measured with a spectroradiometer "SR-UL1R" manufactured by TOPCON TECHNOHOUSE CORPORATION in an environment at 25° C.

TABLE 1

| | Configuration of copolymer | Before high-temperature test VHR (%) | Before high-temperature test Contrast | After high-temperature test VHR (%) | After high-temperature test Contrast |
|---|---|---|---|---|---|
| Example 1-1 | n = 0.8 | 99.5 | 2000 | 99.3 | 1900 |
| Example 1-2 | n = 0.5 | 99.5 | 2000 | 99.5 | 2000 |
| Example 1-3 | n = 0.2 | 99.2 | 1800 | 99.4 | 1700 |
| Comparative Example 1-1 | n = 0 | 99.0 | 1400 | 98.5 | 900 |
| Comparative Example 1-2 | n = 1 | 98.8 | 700 | 96.1 | 500 |

As described in Table 1 above, Examples 1-1 to 1-3 in which FFS modes were produced using the liquid crystal alignment agents including the copolymers represented by the chemical formula (6) and used for forming homogeneous alignment films substantially did not undergo a decrease in VHR or contrast even after being left under irradiation with light from the backlight in a high-temperature environment at 75° C. for 500 hours. This has demonstrated the following: Examples 1-1 to 1-3, even in the case of use under environments at high temperatures for a long period of time, effectively suppress occurrence of ghosting and stain due to a decrease in VHR, and maintain the contrast.

In Examples 1-1 to 1-3, the structure represented by the chemical formula (1) was introduced, to thereby markedly decrease the liquid crystal solubility of the copolymer. This suppresses leaching of a portion of the copolymer to the liquid crystal layer and provides alignment films having a high degree of alignment, which inferentially resulted in suppression of decreases in VHR and contrast. In addition, the structure represented by the chemical formula (1) has high planarity, so that Examples 1-1 to 1-3 in which the structure represented by the chemical formula (1) was introduced provided alignment films having a higher degree of alignment; as a result, liquid crystal molecules had improved alignment properties, which inferentially resulted in improved contrast.

By contrast, in Comparative Example 1-1, after the high-temperature test, decreases in VHF and contrast were observed. In Comparative Example 1-1 in which n was 0, the homopolymer not including the structure represented by the chemical formula (1) formed the alignment films. For this reason, the polymer constituting the alignment films had low rigidity and tended to undergo conformation changes, so that the homopolymer partially leached into the liquid crystal layer, which inferentially resulted in a decrease in VHR. In addition, the homopolymer of Comparative Example 1-1 had low planarity, so that the alignment films constituted by the homopolymer had a low degree of alignment, which inferentially resulted in a decrease in contrast due to the high-temperature test.

In Comparative Example 1-2, even before the high-temperature test, VHR and contrast values were low, and, after the high-temperature test, VHR and contrast values further decreased. This may be caused because Comparative Example 1-2 in which n was 1 included the homopolymer including only the structure represented by the chemical formula (1), hence had low solvent solubility, so that, in the step of forming the coating films, the films were inferentially not uniformly formed over the whole surfaces of the substrates. The substrates had some regions on which the alignment films were not formed, which inferentially resulted in the low contrast also before the high-temperature test. In addition, since the alignment films were not uniformly formed, impurities leached from the bottoms of the alignment films into the liquid crystal layer, or carriers were injected from the electrodes into the liquid crystal layer, which inferentially resulted in the decrease in VHF. Furthermore, in Comparative Example 1-2, wettability to the surfaces of the substrates was not uniform, so that the alignment films may have a film resistance not being uniform.

<Synthesis of Liquid Crystal Alignment Agent for Forming Homogeneous Photo-Alignment Film>

Example 2-1

A tetraamine compound (0.08 mol) represented by the following chemical formula (7), and 0.02 mol of a diamine compound represented by the following chemical formula (8) were dissolved in γ-butyrolactone. Subsequently, 0.10 mol of a dicarboxylic acid compound represented by the following chemical formula (9) was added, and a reaction was caused as in Example 1-1, to obtain a solution including a copolymer precursor (n=0.8).

[Chem. 37]

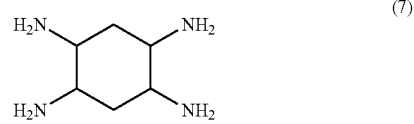

(7)

[Chem. 38]

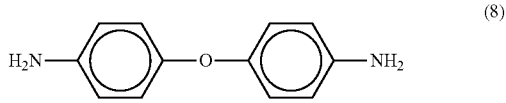

(8)

[Chem. 39]

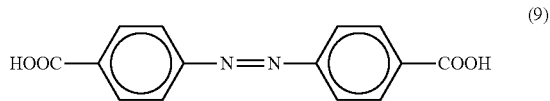

(9)

Subsequently, the precursor was caused to react as in Example 1-1, to obtain a liquid crystal alignment agent including, as the solvent, a mixture of γ-butyrolactone and NMP, and a copolymer including a structure represented by the following chemical formula (10).

[Chem. 40]

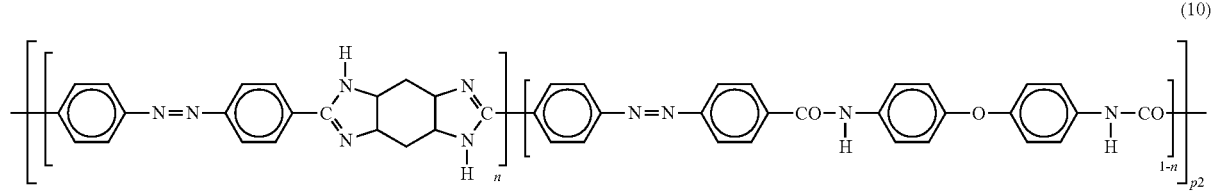
(10)

The copolymer including the structure represented by the chemical formula (10) was a copolymer represented by the chemical formula (2) where X was a structure represented by the following chemical formula (X-1-6), $Y^1$ and $Y^2$ were structures represented by the following chemical formula (Y-2-1) or the following chemical formula (Y-2-2), W was a structure represented by the following chemical formula (W-1-8), $Z^1$ and $Z^2$ were —NH— groups, $R^1$ and $R^2$ were —H (the chemical formula (R-1-1)), and n=0.8.

[Chem. 41]

(X-1-6)

[Chem. 42]

(Y-2-1)

[Chem. 43]

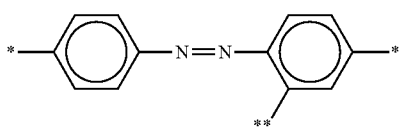
(Y-2-2)

[Chem. 44]

(W-1-8)

Example 2-2, Example 2-3, Comparative Example 2-1, and Comparative Example 2-2

Synthesis was performed as in Example 2-1 except for, in the step of preparing the precursor, changes in the mixing ratio of the tetraamine compound represented by the chemical formula (7) to the diamine compound represented by the chemical formula (8): in the chemical formula (2), n was set to 0.5 in Example 2-2, n was set to 0.2 in Example 2-3, n was set to 0 in Comparative Example 2-1, and n was set to 1 in Comparative Example 2-2. In Comparative Example 2-1, the tetraamine compound was not added, but the diamine compound represented by the chemical formula (8) alone was added, to provide a homopolymer. In Comparative Example 2-2, the diamine compound was not added, but the tetraamine compound represented by the chemical formula (7) alone was added, to provide a homopolymer.

<Production of Liquid Crystal Panels>.

The liquid crystal alignment agents of Examples 2-1 to 2-3 and Comparative Examples 2-1 and 2-2 were used to produce FFS-mode liquid crystal panels by the following method.

A substrate having an FFS-mode electrode structure, and a substrate not including electrodes were prepared. Such a liquid crystal alignment agent was applied to the pair of substrates, and subjected to preliminary firing at 90° C. for 5 minutes. Subsequently, the surfaces of the coating films formed on the pair of substrates were irradiated with linearly polarized ultraviolet light having a central wavelength of 360 nm at 5 J/cm² to thereby perform photo-alignment treatment. Subsequently, main firing at 230° C. for 40 minutes was performed to form homogeneous photo-alignment films. Subsequently, as in Example 1-1, an FFS-mode liquid crystal panel was obtained except for use of a liquid crystal composition containing a negative liquid crystal material having a negative dielectric constant anisotropy.

<High-Temperature Test on Backlight>

As in Example 1-1, the liquid crystal panels obtained above were subjected to the high-temperature test, and measured for, before and after the high-temperature test, voltage holding ratio (VHR) and contrast. The results are described in the following Table 2.

TABLE 2

| | | Before high-temperature test | | After high-temperature test | |
|---|---|---|---|---|---|
| | Configuration of copolymer | VHR (%) | Contrast | VHR (%) | Contrast |
| Example 2-1 | n = 0.8 | 99.5 | 2500 | 99.4 | 2300 |
| Example 2-2 | n = 0.5 | 99.5 | 2100 | 99.5 | 2100 |
| Example 2-3 | n = 0.2 | 99.2 | 1800 | 98.8 | 1700 |
| Comparative Example 2-1 | n = 0 | 97.1 | No alignment | 94.7 | No alignment |
| Comparative Example 2-2 | n = 1 | 98.3 | 300 | 92.0 | 100 |

As described in Table 2 above, Examples 2-1 in which FFS modes were produced using the liquid crystal alignment agents including the copolymers represented by the chemical formula (10) and used for forming homogeneous photo-alignment films substantially did not undergo a decrease in VHR or contrast even after being left under irradiation with light from the backlight at 75° C. for 500 hours. This has demonstrated the following: Examples 2-1 to 2-3, even in the case of use under environments at high temperatures for a long period of time, effectively suppress occurrence of ghosting and stain due to a decrease in VHR, and maintain the contrast.

In Examples 2-1 to 2-3, the structure represented by the chemical formula (1) was introduced to thereby markedly decrease the liquid crystal solubility of the copolymer. This suppresses leaching of a portion of the copolymer to the liquid crystal layer and provides alignment films having a high degree f alignment, which inferentially resulted in suppression of decreases in VHR and contrast. In addition, in Examples 2-1 to 2-3, the structure represented by the chemical formula (1) and having high planarity was introduced, to provide alignment films having a higher degree of alignment; as a result, liquid crystal molecules had improved alignment properties, which inferentially resulted in improved contrast.

By contrast, Comparative Example 2-1 in which n was 0 did not include photoreactive moieties in the alignment films, hence did not provide homogeneous alignment. In addition, in Comparative Example 2-1, after the high temperature test, a decrease in VHR was observed. In Comparative Example 2-1, the homopolymer not including the structure represented by the chemical formula (1) was used to form the alignment films, so that the molecular rigidity was low, and the homopolymer partially leached into the liquid crystal layer, which inferentially resulted in the decrease in VHR. In addition, the homopolymer of Comparative Example 2-1 had low planarity, so that the alignment films constituted by the homopolymer had a low degree of alignment, which inferentially resulted in a decrease in contrast due to the high-temperature test.

In Comparative Example 2-2, even before the high-temperature test, VHR and contrast values were low, and, after the high-temperature test, VHR and contrast values further decreased. This may be caused because Comparative Example 2-2 in which n 1 was included the homopolymer including only the structure represented by the chemical formula (1), hence had low solvent solubility, so that, in the step of forming the coating films, the films were not uniformly formed over the whole surfaces of the substrates. The substrates had some regions on which the alignment films were not formed, which inferentially resulted in the low contrast also before the high-temperature test. In addition, since the alignment films were not uniformly formed, impurities leached from the bottoms of the alignment films into the liquid crystal layer, or carriers were injected from the electrodes into the liquid crystal layer, which inferentially resulted in the decrease in VHR.

<Synthesis of Liquid Crystal Alignment Agent for Forming Homeotropic Alignment Film>

Example 3-1

A tetraamine compound (0.08 mol) represented by the following chemical formula (11), and 0.02 mol f a diamine compound represented by the following chemical formula (12) were dissolved in γ-butyrolactone. Subsequently, a homeotropic alignment component including a structure represented by the following chemical formula (Y-1-1) and a homeotropic alignment group represented by the following chemical formula (R-2-1) was added, and a reaction was caused to obtain a solution including a copolymer precursor (n=0.8).

[Chem. 45]

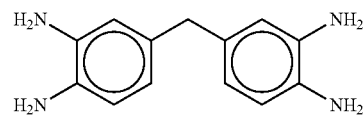
(11)

[Chem. 46]

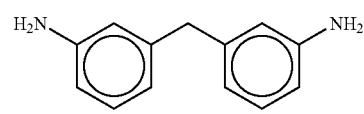
(12)

Subsequently, the precursor was caused to react as in Example 1-1, to obtain a liquid crystal alignment agent including, as the solvent, a mixture of γ-butyrolactone and NMP, and a copolymer including a structure represented by the following chemical formula (13).

[Chem. 47]

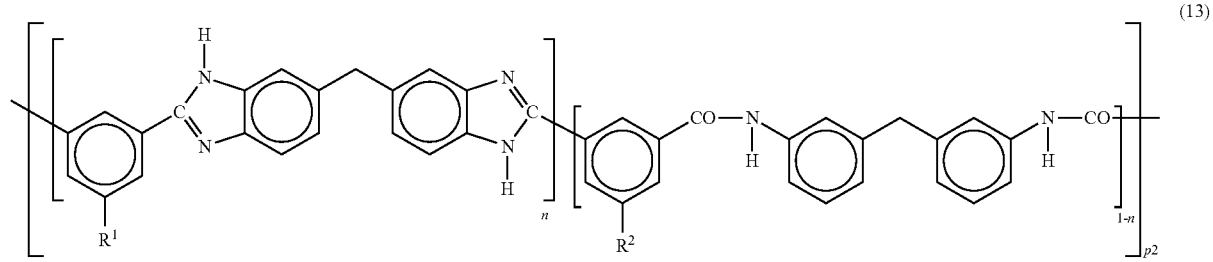
(13)

The copolymer including the structure represented by the chemical formula (13) was a copolymer represented by the chemical formula (2) where X was a structure represented by the following chemical formula (X-1-9), $Y^1$ and $Y^2$ were structures represented by the following chemical formula (Y-1-1), W was a structure represented by the following chemical formula (W-1-10), $Z^1$ and $Z^2$ were —NH— groups, $R^1$ and $R^2$ were any one of a structure represented by the following chemical formula (R-2-1) and —$CH_3$ (the chemical formula (R-1-2)), and n=0.8.

[Chem. 48]

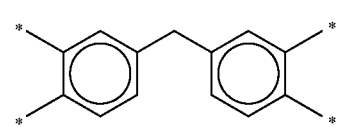
(X-1-9)

-continued

[Chem. 49]

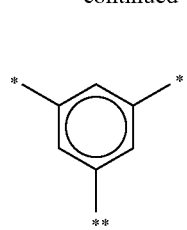
(Y-1-1)

[Chem. 50]

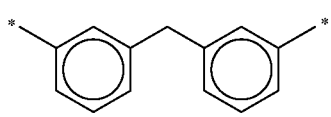
(W-1-10)

[Chem. 51]

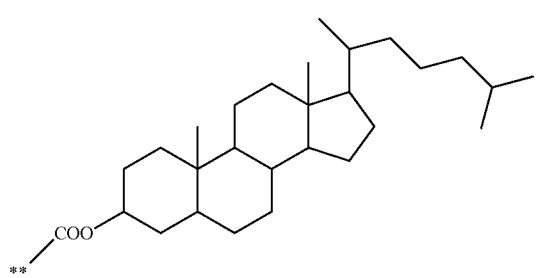
(R-2-1)

Example 3-2, Example 3-3, Comparative Example 3-1, and Comparative Example 3-2

Synthesis was performed as in Example 3-1 except for, in the step of preparing the precursor, changes in the mixing ratio of the tetraamine compound represented by the chemical formula (11) to the diamine compound represented by the chemical formula (12): in the chemical formula (2), n was set to 0.5 in Example 3-2, n was set to 0.2 in Example 3-3, n was set to 0 in Comparative Example 3-1, and n was set to 1 in Comparative Example 3-2. In Comparative Example 3-1, the tetraamine compound and the homeotropic alignment component were not added, but the diamine compound represented by the chemical formula (12) alone was added, to provide a homopolymer. In Comparative Example 3-2, the diamine compound was not added, but the tetraamine compound represented by the chemical formula (11) alone was added, to provide a homopolymer.

<Production of Liquid Crystal Panels>

The liquid crystal alignment agents of Examples 3-1 to 3-3 and Comparative Examples 3-1 and 3-2 were used to produce VA-mode liquid crystal panels by the following method.

Two substrates including an ITO electrode having an opening (slit) were prepared. To the pair of substrates, such a liquid crystal alignment agent was applied, and subjected to preliminary firing at 90° C. for 5 minutes, subsequently to main firing at 200° C. for 40 minutes to forms alignment films. Subsequently, as in Example 1-1, a VA-mode liquid crystal panel was obtained except for not performing the alignment treatment, and use of a liquid crystal composition containing a negative liquid crystal material having a negative dielectric constant anisotropy.

<High-Temperature Test on Backlight>

As in Example 1-1, the liquid crystal panels obtained above were subjected to the high-temperature test, and measured for, before and after the high-temperature test, voltage holding ratio (VHR) and contrast. The results are described in the following Table 3.

TABLE 3

| | | Before high-temperature test | | After high-temperature test | |
|---|---|---|---|---|---|
| | Configuration of copolymer | VHR (%) | Contrast | VHR (%) | Contrast |
| Example 3-1 | n = 0.8 | 99.5 | 3500 | 99.4 | 3300 |
| Example 3-2 | n = 0.5 | 99.5 | 3600 | 99.3 | 3600 |
| Example 3-3 | n = 0.2 | 99.5 | 3600 | 98.8 | 3500 |
| Comparative Example 3-1 | n = 0 | 97.1 | No alignment | 94.7 | No alignment |
| Comparative Example 3-2 | n = 1 | 98.8 | 200 | 92.0 | 130 |

As described in Table 3 above, Examples 3-1 to 3-3 in which VA modes were produced using the liquid crystal alignment agents including the copolymers represented by the chemical formula (13) and used for forming homogeneous photo-alignment films substantially did not undergo a decrease in VHR or contrast even after being left under irradiation with light from the backlight at 75° C. for 500 hours. This has demonstrated the following: Examples 3-1 to 3-3, even in the case of use under environments at high temperatures for a long period of time, effectively suppress occurrence of ghosting and stain due to a decrease in VHR, and maintain the contrast.

In Examples 3-1 to 3-3, the structure represented by the chemical formula (1) was introduced to thereby markedly decrease the liquid crystal solubility of the copolymer. This suppresses leaching of a portion of the copolymer to the liquid crystal layer and provides alignment films having a high degree of alignment, which inferentially resulted in suppression of decreases in VHR and contrast. In addition, in Examples 3-1 to 3-3, the structure represented by the chemical formula (1) and having high planarity was introduced, to provide alignment films having a higher degree of alignment; as a result, liquid crystal molecules had improved alignment properties, which inferentially resulted in improved contrast.

By contrast, Comparative Example 3-1 in which n was 0 did not include homeotropic alignment functional groups in the alignment films, and hence did not provide homeotropic alignment. In addition, in Comparative Example 3-1, after the high-temperature test, a decrease in VHR was observed. In Comparative Example 3-1, the homopolymer not including the structure represented by the chemical formula (1) was used to form the alignment films, so that the molecular rigidity was low, and the homopolymer partially leached into the liquid crystal layer, which inferentially resulted in the decrease in VHR. In addition, in Comparative Example 3-1, the homopolymer did not include homeotropic alignment groups, which inferentially resulted in the decrease in the contrast due to the high-temperature test.

In Comparative Example 3-2, even before the high-temperature test, VHR and contrast values were low, and, after the high-temperature test, VHR and contrast values further decreased. This may be caused because Comparative Example 3-2 in which n was 1 included the homopolymer including only the structure represented by the chemical formula (1), hence had low solvent solubility, so that, in the step of forming the coating films, the films were not uniformly formed over the whole surfaces of the substrates. The substrates had some regions on which the alignment films were not formed, which inferentially resulted in the low contrast also before the high-temperature test. In addition, since the alignment films were not uniformly formed, impurities leached from the bottoms of the alignment films into the liquid crystal layer, or carriers were injected from the electrodes into the liquid crystal layer, which inferentially resulted in the decrease in VHR.

<Synthesis of Liquid Crystal Alignment Agent. For Forming Homeotropic Photo-Alignment Film>

Example 4-1

A tetraamine compound (0.08 mol) represented by the following chemical formula (3) and 0.02 mol of a diamine compound represented by the following chemical formula (8) were dissolved in γ-butyrolactone. Subsequently, a homeotropic photo-alignment component including a structure represented by the following chemical formula (Y-1-2) and a homeotropic photo-alignment group represented by the following chemical formula (R-4-19) was added, and a reaction was caused to obtain a solution including a copolymer precursor (n=0.8).

[Chem. 52]

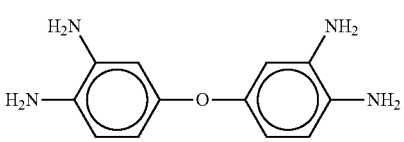
(3)

[Chem. 53]

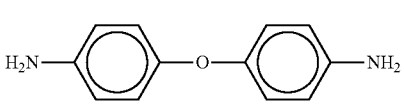
(8)

Subsequently, the precursor was caused to react as in Example 1-1, to obtain a liquid crystal alignment agent including, as the solvent, a mixture of γ-butyrolactone and NMP, and a copolymer including a structure represented by the following chemical formula (14).

[Chem. 54]

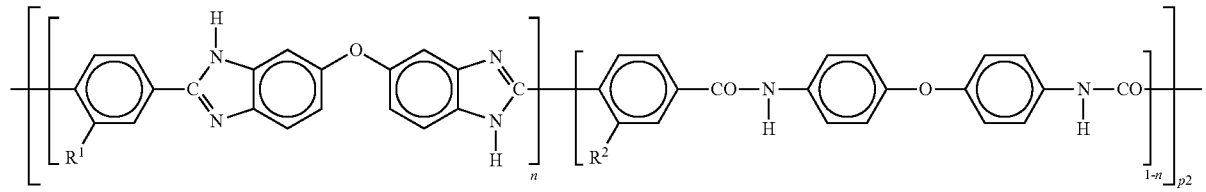
(14)

The copolymer including the structure represented by the chemical formula (14) was a copolymer represented by the chemical formula (2) where X was a structure represented by the following chemical formula (X-1-8), $Y^1$ and $Y^2$ were structures represented by the following chemical formula (Y-1-2), W was a structure represented by the following chemical formula (W-1-8), $Z^1$ and $Z^2$ were —NH— groups, $R^1$ and $R^2$ were structures represented by the following chemical formula (R-4-19), and n=0.8.

[Chem. 55]

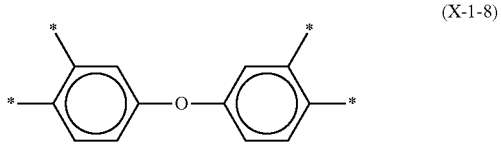
(X-1-8)

[Chem. 56]

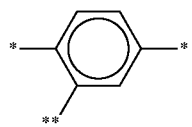
(Y-1-2)

[Chem. 57]

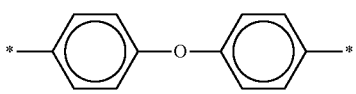
(W-1-8)

[Chem. 58]

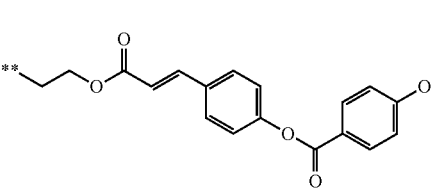
(R-4-19)

Example 4-2, Example 4-3, Comparative Example 4-1, and Comparative Example 4-2

Synthesis was performed as in Example 4-1 except for, in the step of preparing the precursor, changes in the mixing ratio of the tetraamine compound represented by the chemical formula (3) to the diamine compound represented by the chemical formula (8): in the chemical formula (2), n was set to 0.5 in Example 4-2, n was set to 0.2 in Example 4-3, n was set to 0 in Comparative Example 4-1, and n was set to 1 in Comparative Example 4-2. In Comparative Example 4-1, the tetraamine compound was not added, but the diamine compound represented by the chemical formula (8) alone was added, to provide a homopolymer. In Comparative Example 4-2, the diamine compound was not added, but the tetraamine compound represented by the chemical formula (3) alone was added, to provide a homopolymer.

<Production of Liquid Crystal Panels>

The liquid crystal alignment agents of Examples 4-1 to 4-3 and Comparative Examples 4-1 and 4-2 were used to produce RTN-mode liquid crystal panels by the following method.

Two substrates in which ITO electrodes without openings were formed over the whole surfaces of the substrates were prepared. To the pair of substrates, such a liquid crystal alignment agent was applied, and subjected to preliminary firing at 90° C. for 5 minutes, subsequently to main firing at 200° C. for 40 minutes. Subsequently, the surfaces of the coating films formed on the pair of substrates were irradiated with linearly polarized ultraviolet light having a central wavelength of 330 nm at 50 mJ; $cm^2$ to thereby perform photo-alignment treatment. Subsequently, as in Example 1-1, an RTN-mode liquid crystal panel was obtained except for use of a liquid crystal composition containing negative liquid crystal material having a negative dielectric constant anisotropy.

<High-Temperature Test on Backlight>

As in Example 1-1, the liquid crystal panels obtained above were subjected to the high-temperature test, and measured for, before and after the high-temperature test, voltage holding ratio (VHR) and contrast. The results are described in the following Table 4.

TABLE 4

|  | Configuration of copolymer | Before high-temperature test | | After high-temperature test | |
|---|---|---|---|---|---|
|  |  | VHR (%) | Contrast | VHR (%) | Contrast |
| Example 4-1 | n = 0.8 | 99.3 | 4700 | 99.1 | 4600 |
| Example 4-2 | n = 0.5 | 99.3 | 4500 | 99.3 | 4500 |
| Example 4-3 | n = 0.2 | 99.4 | 4600 | 98.9 | 4500 |
| Comparative Example 4-1 | n = 0 | 98.0 | 4600 | 91.1 | 4400 |
| Comparative Example 4-2 | n = 1 | 98.1 | 300 | 88.5 | 140 |

As described in Table 4 above, Examples 4-1 to 4-3 in which RTN modes were produced using the liquid crystal alignment agents including the copolymers represented by the chemical formula (14) and used for forming homeotropic photo-alignment films substantially did not undergo a decrease in VHR or contrast even after being left under irradiation with light from the backlight at 75° C. for 500 hours. This has demonstrated the following: Examples 4-1 to 4-3, even in the case of use under environments at high temperatures for a long period of time, effectively suppress occurrence of ghosting and stain due to a decrease in VHR, and maintain the contrast.

In Examples 4-1 to 4-3, the structure represented by the chemical formula (1) was introduced to thereby markedly decrease the liquid crystal solubility of the copolymer. This suppresses leaching of a portion of the copolymer to the liquid crystal layer and provides alignment films having a high degree of alignment, which inferentially resulted in suppression of decreases in VHR and contrast. In addition, in Examples 4-1 to 4-3, the structure represented by the chemical formula (1) having high planarity was introduced, to provide alignment films having a higher degree of alignment; as a result, liquid crystal molecules had improved alignment properties, which inferentially resulted in improved contrast.

By contrast, in Comparative Example 4-1, after the high-temperature test, decreases in VHR and contrast were observed. In Comparative Example 4-1 in which n was 0, the homopolymer not including the structure represented by the chemical formula (1) was used to form the alignment films, so that the molecular rigidity was low, and the homopolymer partially leached into the liquid crystal layer, which inferentially resulted in the decrease in VHR. In addition, the homopolymer of Comparative Example 4-1 had high flexibility, and tended to undergo thermal conformation changes, which inferentially resulted in the decrease in the contrast due to the high-temperature test.

In Comparative Example 4-2, even before the high-temperature test, VHR and contrast values were low, and the VHR and contrast values further decreased after the high-temperature test. In particular, before the high-temperature test, the contrast was very low. This may be caused because Comparative Example 4-2 in which n was 1 included the homopolymer including only the structure represented by the chemical formula (1), hence had low solvent solubility, so that the coating films were not uniformly formed over the whole surfaces of the substrates. In addition, in Comparative Example 4-2, since the alignment films were not uniformly formed, impurities leached from the bottoms of the alignment films into the liquid crystal layer, or carriers were injected from the electrodes into the liquid crystal layer, which inferentially resulted in the decrease in VHR. Furthermore, in Comparative Example 4, since the polymer main chain was rigid, the homeotropic photo-alignment groups got into the films, and the film surfaces had a low distribution density of the homeotropic photo-alignment groups, which inferentially resulted in the decrease in the contrast.

<Synthesis of Liquid Crystal Alignment Agent for Forming Homogeneous Photo-Alignment Film>

Example 5-1

As in Example 4-1, 0.08 mol of the tetraamine compound represented by the chemical formula (3), and 0.02 mol of the diamine compound represented by the chemical formula (8) were dissolved in γ-butyrolactone. Subsequently, a homogeneous photo-alignment component including the structure represented by the chemical formula (Y-1-1), and a homogeneous photo-alignment group represented by the following chemical formula (R-3-1) was added, and a reaction was caused to obtain a solution including a copolymer precursor (n=0.8).

Subsequently, the precursor was caused to react as in Example 1-1, to obtain a liquid crystal alignment agent including, as the solvent, a mixture of γ-butyrolactone and NMP, and a copolymer including a structure represented by the following chemical formula (15).

[Chem. 59]

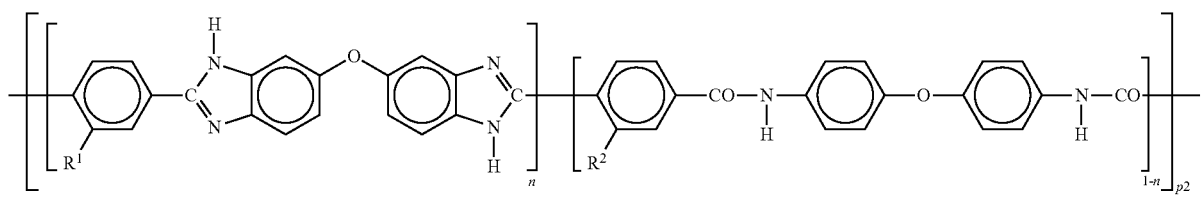

(15)

The copolymer including the structure represented by the chemical formula (15) was a copolymer represented by the chemical formula (2) where X was the structure represented by the chemical formula (X-1-8), $Y^1$ and $Y^2$ were the structures represented by the chemical formula (Y-1-2), N was the structure represented by the chemical formula (W-1-8), $Z^1$ and $Z^2$ were —NH— groups, $R^1$ and $R^2$ were structures represented by the following chemical formula (R-3-1), and n=0.8.

[Chem. 60]

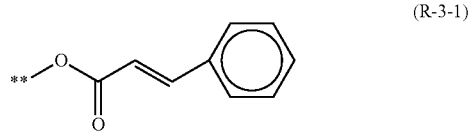

(R-3-1)

Example 5-2, Example 5-3, Comparative Example 5-1, and Comparative Example 5-2

Synthesis was performed as in Example 5-1 except for, in the step of preparing the precursor, changes in the mixing ratio of the tetraamine compound represented by the chemical formula (3) to the diamine compound represented by the chemical formula (8): in the chemical formula (2), n was set to 0.5 in Example 5-2, n was set to 0.2 in Example 5-3, n was set to 0 in Comparative Example 5-1, and n was set to 1 in Comparative Example 5-2. In Comparative Example 5-1, the tetraamine compound was not added, but the diamine compound represented by the chemical formula (8) alone was added, to provide a homopolymer. In Comparative Example 5-2, the diamine compound was not added, but the tetraamine compound represented by the chemical formula (3) alone was added, to provide a homopolymer.

<Production of Liquid Crystal Panels>

The liquid crystal alignment agents of Examples 5-1 to 5-3 and Comparative Examples 5-1 and 5-2 were used to produce FFS-mode liquid crystal panels by the following method.

A substrate having an FFS-mode electrode structure, and a substrate not including electrodes were prepared. Such a liquid crystal alignment agent was applied to the pair of substrates, and subjected to preliminary firing at 90° C. for 5 minutes, subsequently to main firing at 200° C. for 40 minutes. Subsequently, the surfaces of the coating films formed on the pair of substrates were irradiated with linearly polarized ultraviolet light having a central wavelength of 330 nm at 30 mJ/cm² to thereby perform photo-alignment treatment. Subsequently, as in Example 1-1, an FFS-mode liquid crystal panel was obtained except for use of a liquid crystal composition containing a negative liquid crystal material having a negative dielectric constant anisotropy.

<High temperature Test on Backlight>

As in Example 1-1, the liquid crystal panels obtained above were subjected to the high-temperature test, and measured for, before and after the high-temperature test, voltage holding ratio (VHR) and contrast. The results are described in the following Table 5.

TABLE 5

| | Configuration of copolymer | Before high-temperature test | | After high-temperature test | |
|---|---|---|---|---|---|
| | | VHR (%) | Contrast | VHR (%) | Contrast |
| Example 5-1 | n = 0.8 | 98.5 | 1100 | 94.2 | 1050 |
| Example 5-2 | n = 0.5 | 98.5 | 1100 | 94.4 | 1050 |
| Example 5-3 | n = 0.2 | 98.9 | 1000 | 94.4 | 930 |
| Comparative Example 5-1 | n = 0 | 97.7 | 920 | 94.0 | 830 |
| Comparative Example 5-2 | n = 1 | 96.0 | 240 | 80.7 | 80 |

As described in Table 5 above, Examples 5-1 to 5-3 in which FFS modes were produced using the liquid crystal alignment agents including the copolymers represented by the chemical formula (15) and used for forming homogeneous photo-alignment films underwent slight decreases in VHR and contrast even after being left under irradiation with light from the backlight at 75° C. for 500 hours. This has demonstrated the following: Examples 5-1 to 5-3, even in the case of use under environments at high temperatures for a long period of time, effectively suppress occurrence of ghosting and stain due to a decrease in VHR, and maintain the contrast.

In Examples 5-1 to 5-3, the structure represented by the chemical formula (1) was introduced to thereby markedly decrease the liquid crystal solubility of the copolymer. This suppresses leaching of a portion of the copolymer to the liquid crystal layer and provides alignment films having a high degree of alignment, which inferentially resulted in suppression of decreases in VHR and contrast. In addition, in Examples 5-1 to 5-3, the structure represented by the chemical formula (1) and having high planarity was introduced, to provide alignment films having a higher degree of alignment; as a result, liquid crystal molecules had improved alignment properties, which inferentially resulted in improved contrast.

By contrast, in Comparative Example 5-1, after the high-temperature test, VHR and contrast seriously decreased. In Comparative Example 5-1 in which n was 0, the homopolymer including the structure represented by the chemical formula (1) was used to form the alignment films, so that the molecular rigidity was low, and the homopolymer partially leached into the liquid crystal layer, which inferentially resulted in the decrease in VHR. In addition, the homopolymer of Comparative Example 5-1 had low planarity, so that the alignment films constituted by the homopolymer had a low degree of alignment, which inferentially resulted in the decrease in contrast due to the high-temperature test.

In Comparative Example 5-2, even before the high-temperature test, VHR and contrast values were low, and the VHR and contrast values further decreased after the high-temperature test. In particular, before the high-temperature test, the contrast was very low. This may be caused because Comparative Example 5-2 in which n was 1 included the homopolymer including only the structure represented by the chemical formula (1), hence had low solvent solubility, so that the coating films were not uniformly formed over the whole surfaces of the substrates.

APPENDIX

An embodiment according to the present invention may be a liquid crystal alignment agent including a copolymer including a structure represented by a chemical formula (1) below, and a solvent,

[Chem. 61]

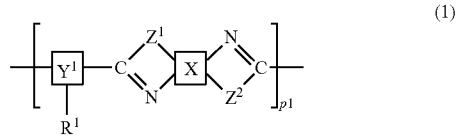

(1)

(where X is any one of structures represented by chemical formulas (X-1-1) to (X-1-9) below, or any one of structures represented by chemical formulas (X-2-1) to (X-2-4) below, $Y^1$ is any one of structures represented by chemical formulas (Y-1-1) to (Y-1-16) below, or any one of structures represented by chemical formulas (Y-2-1) to (Y-2-10) below, $Z^1$ and $Z^2$ are the same or different, and represent an —NH— group, an —O— group, or a —S— group;

$R^1$ represents a homogeneous alignment group, a homeotropic alignment group, or a photoreactive functional group; and $p^1$ represents a repeat number, and is an integer of 1 or more),

[Chem. 62]

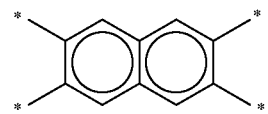

(X-1-1)

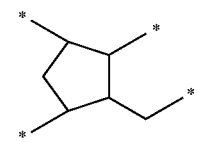

(X-1-2)

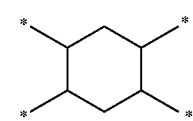

(X-1-3)

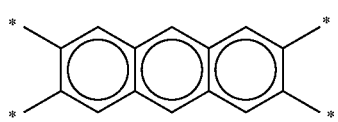

(X-1-4)

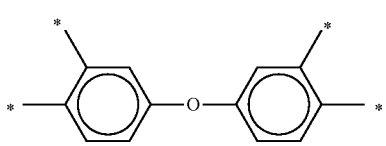

(X-1-5)

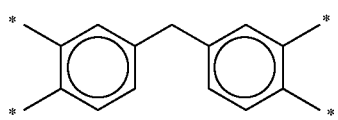

(X-1-6)

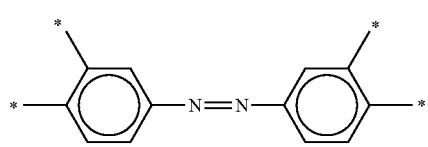

(X-1-7)

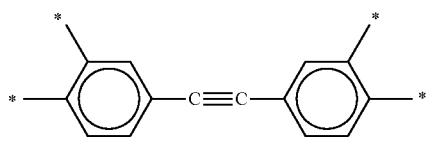

(X-1-8)

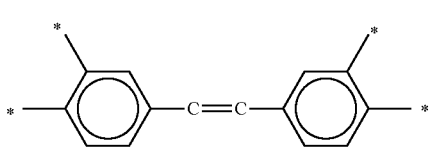

(X-1-9)

[Chem. 63]

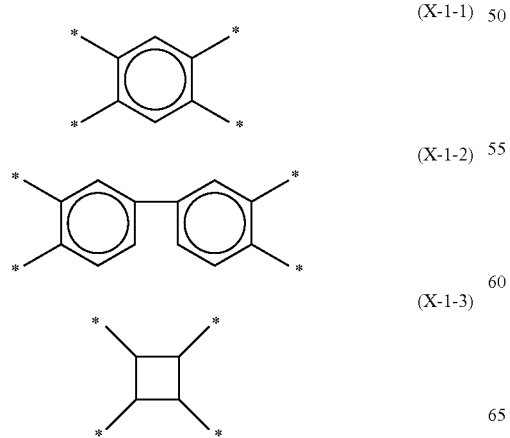

(X-2-1)

(X-2-2)

(X-2-3)

(X-2-4)

[Chem. 64]
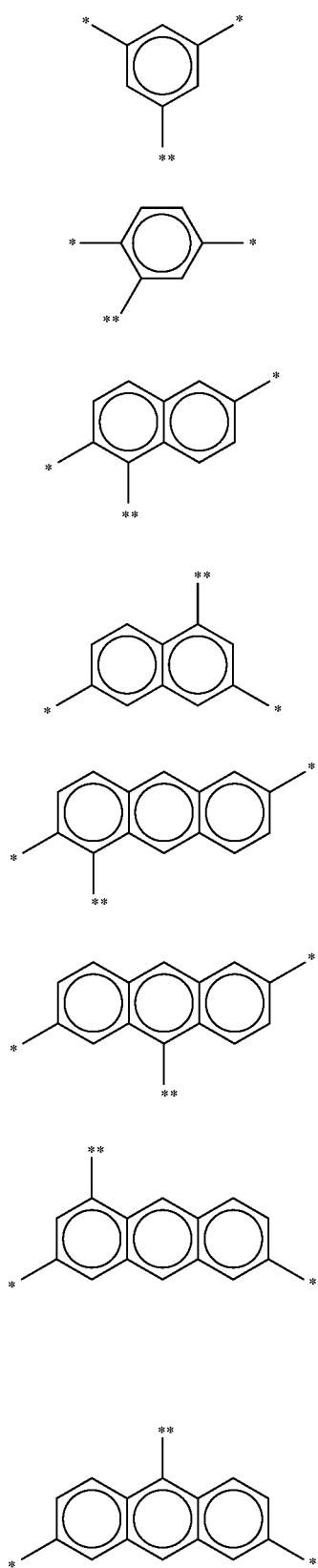
(Y-1-1)
(Y-1-2)
(Y-1-3)
(Y-1-4)
(Y-1-5)
(Y-1-6)
(Y-1-7)
(Y-1-8)
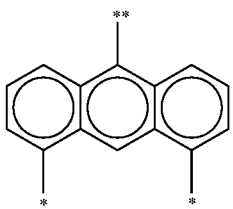
(Y-1-9)
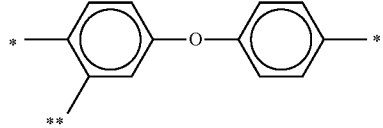
(Y-1-10)
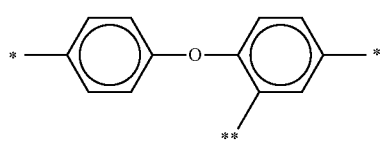
(Y-1-11)
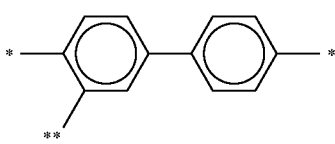
(Y-1-12)
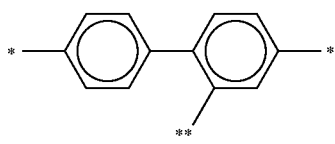
(Y-1-13)
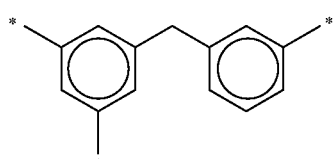
(Y-1-14)
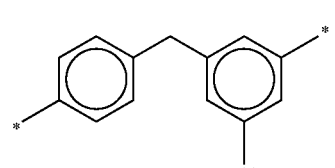
(Y-1-15)
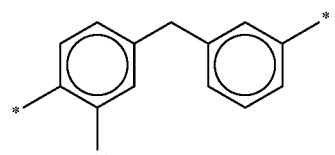
(Y-1-16)
[Chem. 65]
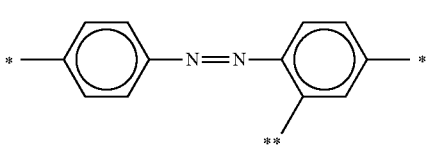
(Y-2-1)

-continued (Y-2-2) 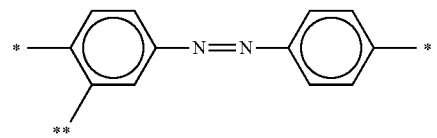

(Y-2-3) 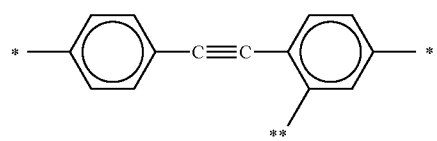

(Y-2-4) 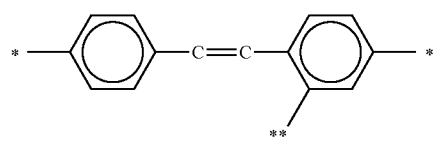

(Y-2-5) 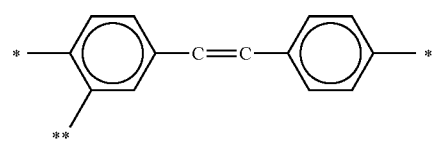

(Y-2-6) 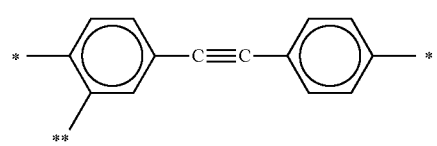

(X-2-7) 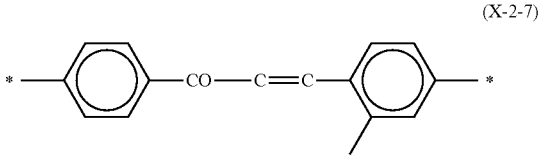

(X-2-8) 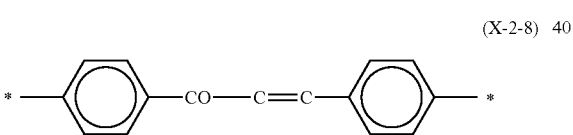

(Y-2-9) 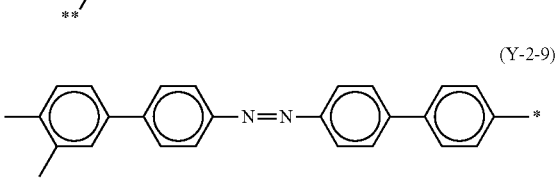

(Y-2-10) 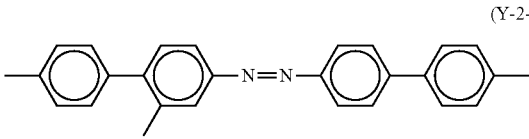

$Y^1$ above may be any one of the structures represented by the chemical formulas (Y-1-1) to (Y-1-16).

$Y^1$ above may be any one of the structures represented by the chemical formulas (Y-2-1) to (Y-2-10).

The copolymer may be represented by a chemical formula (2) below,

[Chem. 66]

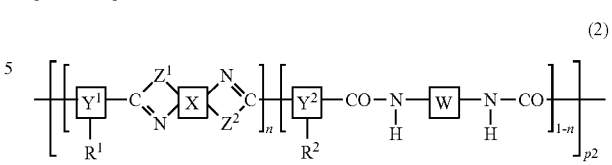

(2)

(where X is any one of the structures represented by the chemical formulas (X-1-1) to (X-1-9), or any one of the structures represented by the chemical formulas (X-2-1) to (X-2-4), $Y^1$ and $Y^2$ are the same or different, and are any one of the structures represented by the chemical formulas (Y-1-1) to (Y-1-16), or any one of the structures represented by the chemical formulas (Y-2-1) to (Y-2-10), $Z^1$ and $Z^2$ are the same or different, and represent an —NH— group, an —O— group, or a —S— group, $R^1$ and $R^2$ are the same or different, and represent a homogeneous alignment group, a homeotropic alignment group, or a photoreactive functional group, W is any one of structures represented by chemical formulas (W-1-1) to (W-1-11) below, or any one of structures represented by chemical formulas (W-2-1) to (W-2-5) below, n is a real number of more than 0 and less than 1, and $p^2$ represents a repeat number, and is an integer of 1 or more),

[Chem. 67]

(W-1-1) 

(W-1-2) 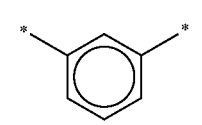

(W-1-3) 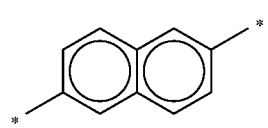

(W-1-4) 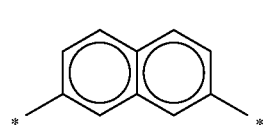

(W-1-5) 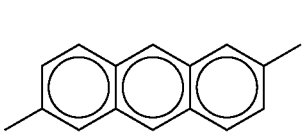

(W-1-6) 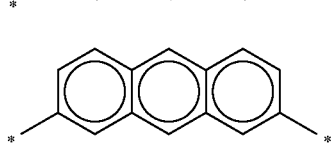

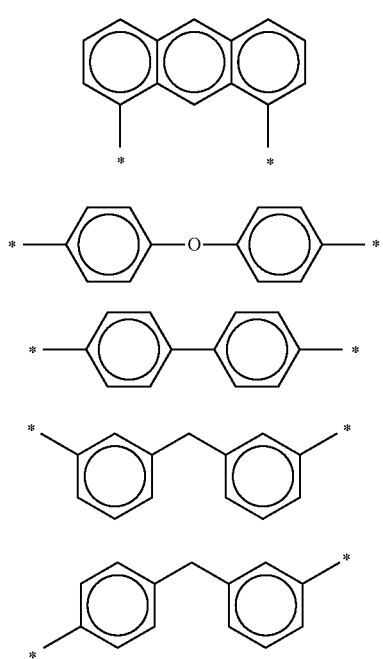

(W-1-7)
(W-1-8)
(W-1-9)
(W-1-10)
(W-1-11)

[Chem. 68]

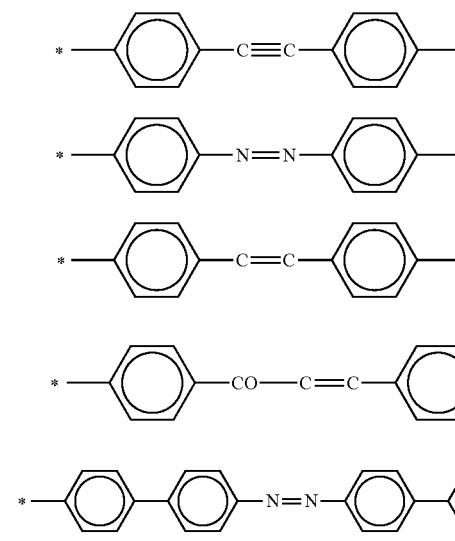

(W-2-1)
(W-2-2)
(W-2-3)
(W-2-4)
(W-2-5)

At least one of $R^1$ and $R^2$ above may be the photoreactive functional group.

$Y^1$ and $Y^2$ above may be the same or different, and may be any one of the structures represented by the chemical formulas (Y-1-1) to (Y-1-16).

$Y^1$ and $Y^2$ above may be the same or different, and may be any one of the structures represented by the chemical formulas (Y-2-1) to (Y-2-10).

W above may be any one of the structures represented by the chemical formulas (W-1-1) to (W-1-11).

W above may be any one of the structures represented by the chemical formulas (W-2-1) to (W-2-5).

X above may be any one of the structures represented by the chemical formulas (X-1-1) to (X-1-9).

X above may be any one of the structures represented by the chemical formulas (X-2-1) to (X-2-4).

The photoreactive functional group may be any one of a cinnamate group, a chalcone group, an azobenzene group, a coumarin group, a tolan group, and a stilbene group.

The homogeneous alignment group may be any one of structures represented by chemical formulas (R-1-1) to (R-1-8) below,

[Chem. 69]

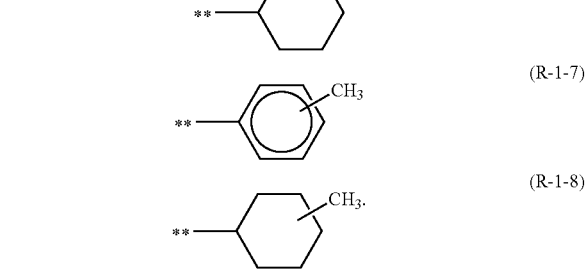

The homeotropic alignment group may be any one of structures represented by chemical formulas (R-2-1) to (R-2-7) below,

[Chem. 70]

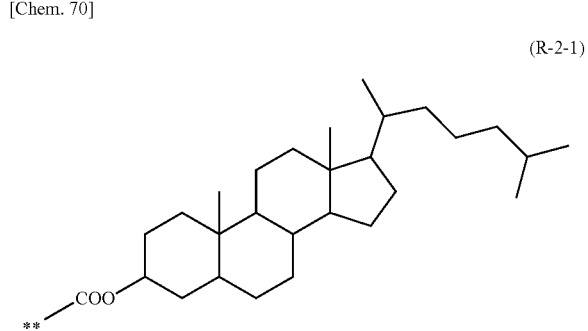

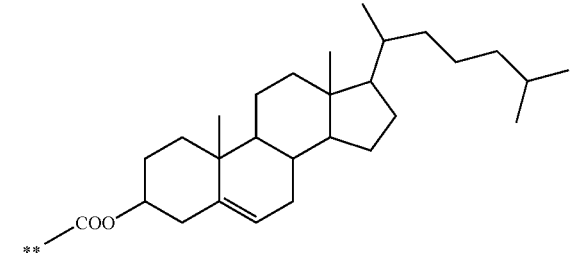

-continued

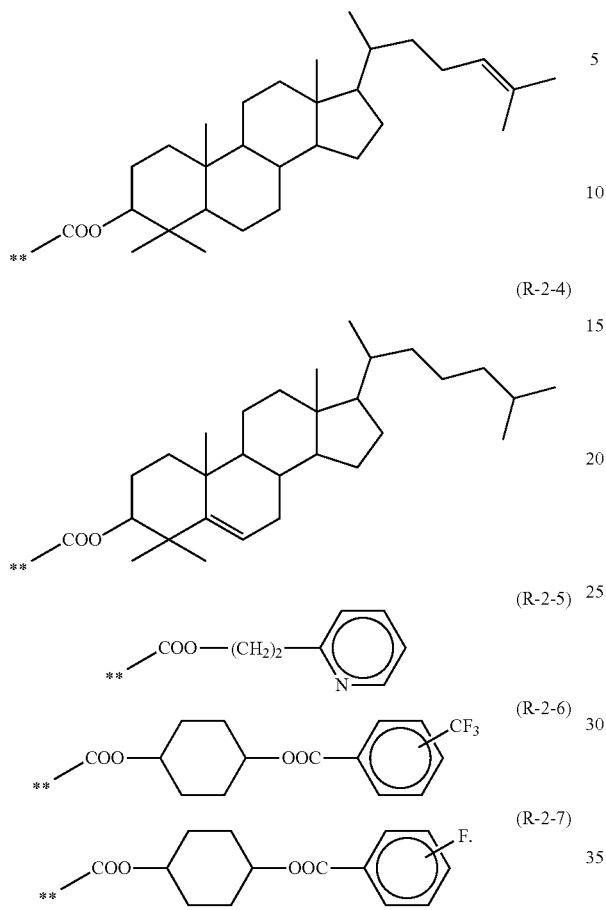

(R-2-3)

(R-2-4)

(R-2-5)

(R-2-6)

(R-2-7)

Another embodiment of the present invention may be a liquid crystal panel including a pair of substrates, a liquid crystal layer held between the pair of substrates, an alignment film disposed between at least one of the pair of substrates and the liquid crystal layer, wherein the alignment film includes a structure derived from a copolymer including a structure represented by a chemical formula (1) below,

[Chem. 71]

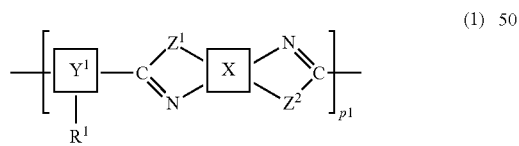

(1)

(where X is any one of structures represented by chemical formulas (X-1-1) to (X-1-9) below, or any one of structures represented by chemical formulas (X-2-1) to (X-2-4) below, $Y^1$ is any one of structures represented by chemical formulas (Y-1-1) to (Y-1-16) below, or any one of structures represented by chemical formulas (Y-2-1) to (Y-2-10) below, $Z^1$ and $Z^2$ are the same or different, and represent an —NH— group, an —O— group, or a —S— group, $R^1$ represents a homogeneous alignment group, a homeotropic alignment group, or a photoreactive functional group, and $p^1$ represents a repeat number, and is an integer of 1 or more),

[Chem. 72]

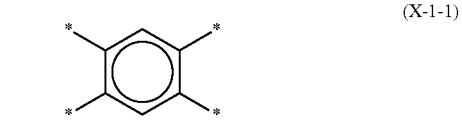
(X-1-1)

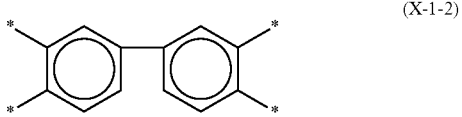
(X-1-2)

(X-1-3)

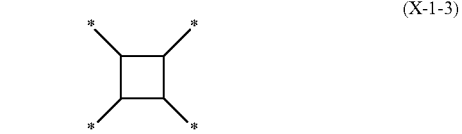
(X-1-4)

(X-1-5)

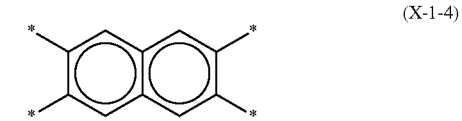
(X-1-6)

(X-1-7)

(X-1-8)

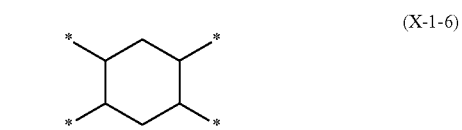
(X-1-9)

[Chem. 73]

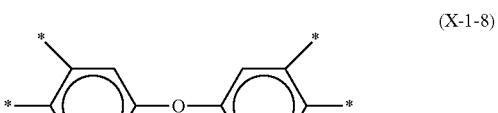
(X-2-1)

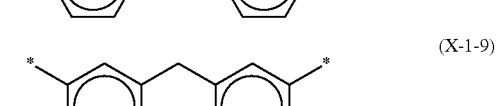
(X-2-2)

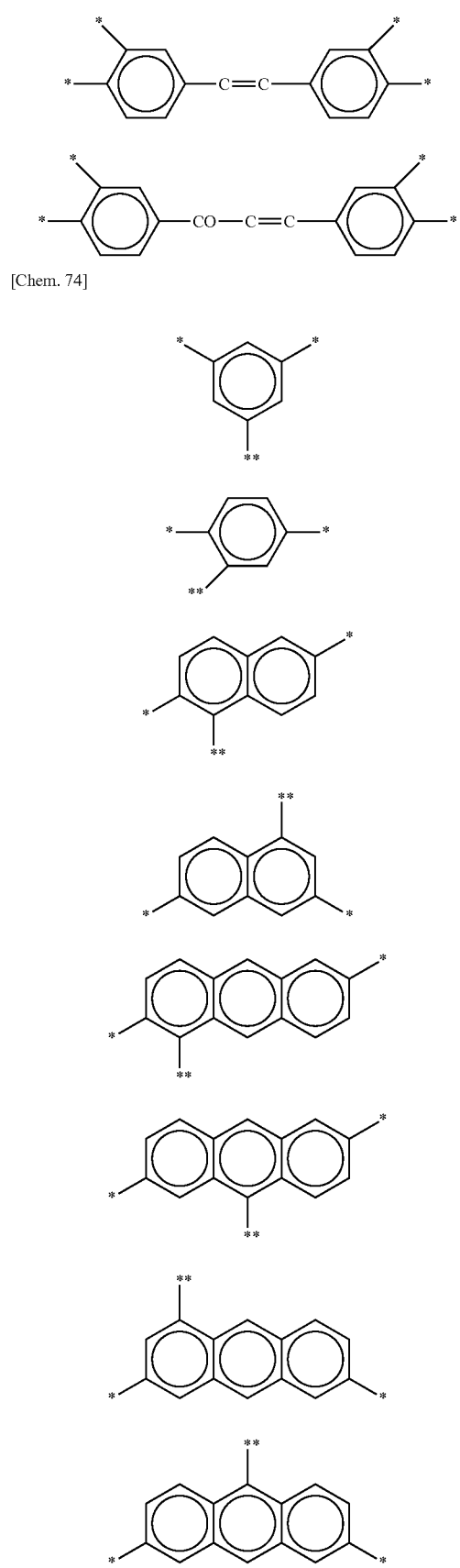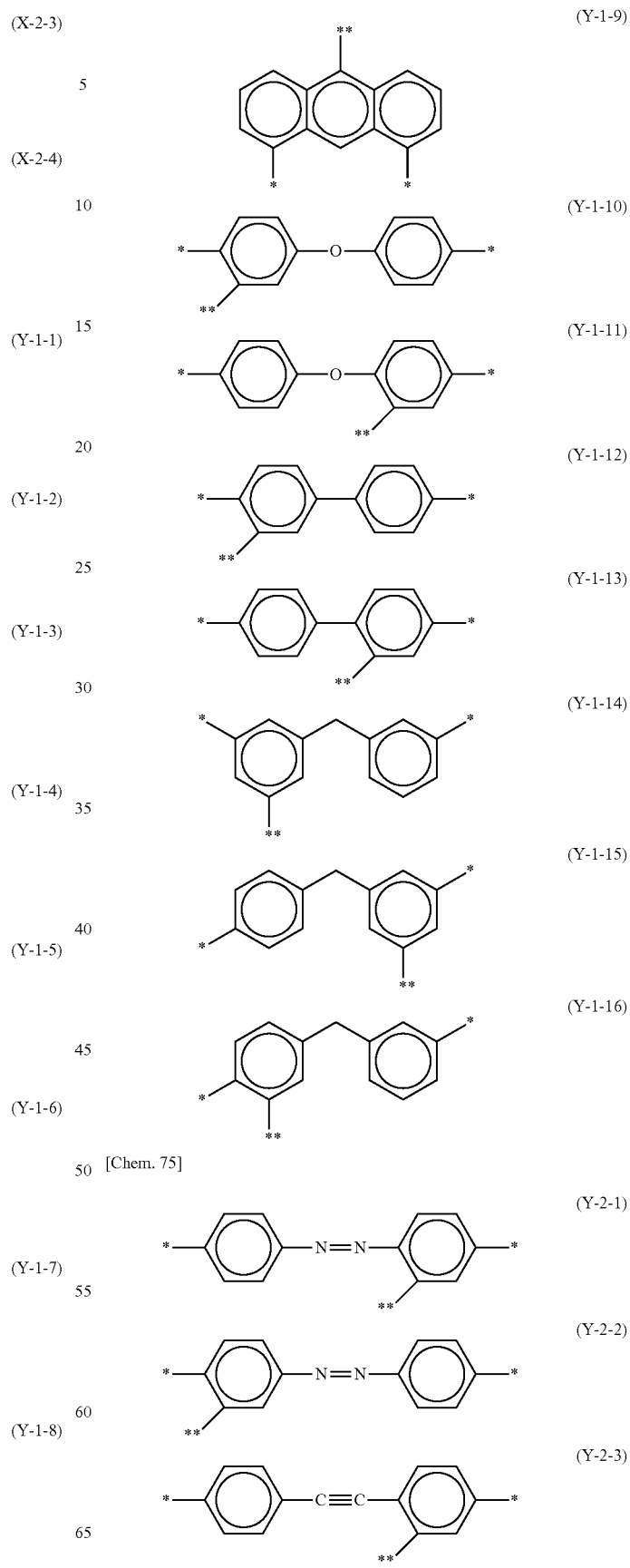

-continued (Y-2-4)

(Y-2-5)

(Y-2-6)

(Y-2-7)

(Y-2-8)

(Y-2-9)

(Y-2-10)

The copolymer may be represented by a chemical formula (2) below,

[Chem. 76]

$$\left\{ \left[ \begin{array}{c} Y^1 \\ | \\ R^1 \end{array} - C \begin{array}{c} Z^1 \\ \diagdown \\ N \end{array} X \begin{array}{c} N \\ \diagdown \\ Z^2 \end{array} C - \begin{array}{c} Y^2 \\ | \\ R^2 \end{array} \right]_n \left[ Y^2 - CO - N \atop H - W - N \atop H - CO \right]_{1-n} \right\}_{p2} \quad (2)$$

(where X is any one of the structures represented by the chemical formulas (X-1-1) to (X-1-9), or any one of the structures represented by the chemical formulas (X-2-1) to (X-2-4), $Y^1$ and $Y^2$ are the same or different, and are any one of the structures represented by the chemical formulas (Y-1-1) to (Y-1-16), or any one of the structures represented by the chemical formulas (Y-2-1) to (Y-2-10), $Z^1$ and $Z^2$ are the same or different, and represent an —NH— group, an —O— group, or a —S— group, $R^1$ and $R^2$ are the same or different, and represent a homogeneous alignment group, a homeotropic alignment group, or a photoreactive functional group, W is any one of structures represented by chemical formulas (W-1-1) to (W-1-11) below, or any one of structures represented by chemical formulas (W-2-1) to (W-2-5) below, n is a real number of more than 0 and less than 1, and $p^2$ represents a repeat number, and is an integer of 1 or more),

[Chem. 77]

(W-1-1)

(W-1-2)

(W-1-3)

(W-1-4)

(W-1-5)

(W-1-6)

-continued (W-1-7)

(W-1-8)

-continued

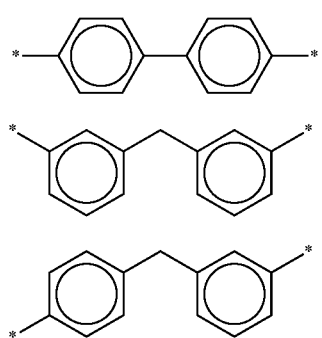

(W-1-9)

(W-1-10)

(W-1-11)

(W-2-1)

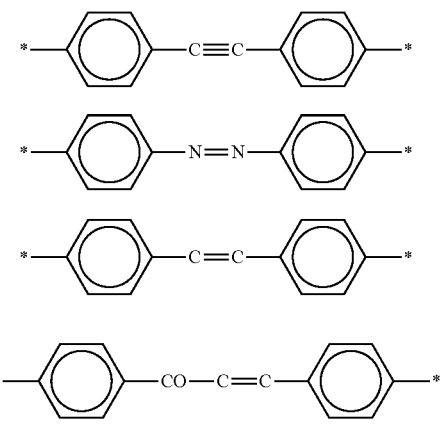

(W-2-2)

(W-2-3)

(W-2-4)

(W-2-5)

At least one of $R^1$ and $R^2$ above may be the photoreactive functional group.

The photoreactive functional group may be any one of a cinnamate group, a chalcone group, an azobenzene group, a coumarin group, a tolan group, and a stilbene group.

The homogeneous alignment group may be any one of structures represented by chemical formulas (R-1-1) to (R-1-8) below,

[Chem. 79]

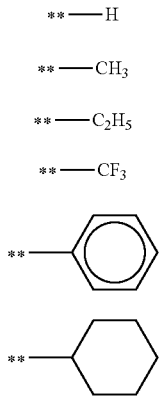

(R-1-1)
(R-1-2)
(R-1-3)
(R-1-4)
(R-1-5)

(R-1-6)

-continued

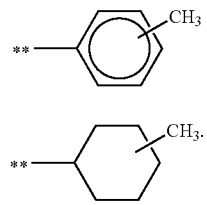

(R-1-7)

(R-1-8)

The homeotropic alignment group may be any one of structures represented by chemical formulas (R-2-1) to (R-2-7) below,

[Chem. 80]

(R-2-1)

(R-2-2)

(R-2-3)

(R-2-4)

-continued

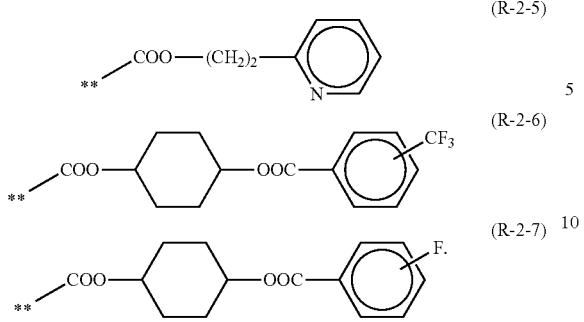

(R-2-5)
(R-2-6)
(R-2-7)

The above-described embodiments according to the present invention may be appropriately combined together without departing from the spirit and scope of the present invention.

REFERENCE SIGNS LIST

10, 20 substrate
30 liquid crystal layer
40 alignment film
60 sealing material
70 polarizing plate
100 liquid crystal panel

The invention claimed is:

1. A liquid crystal alignment agent comprising a copolymer including a structure represented by a chemical formula (1) below and a solvent,

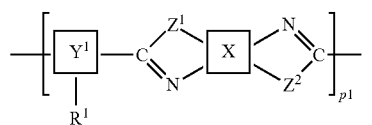

(1)

wherein X is any one of structures represented by chemical formulas (X-1-1) to (X-1-9) below, or any one of structures represented by chemical formulas (X-2-1) to (X-2-4) below, $Y^1$ is any one of structures represented by chemical formulas (Y-1-1) to (Y-1-16) below, or any one of structures represented by chemical formulas (Y-2-1) to (Y-2-10) below, $Z^1$ and $Z^2$ are the same or different, and represent an —NH— group, an —O— group, or a —S— group, $R^1$ represents a photoreactive functional group, and $p^1$ represents a repeat number and is an integer of 1 or more

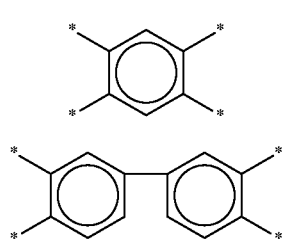

(X-1-1)
(X-1-2)

-continued

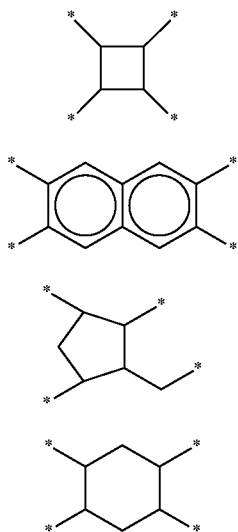

(X-1-3)
(X-1-4)
(X-1-5)
(X-1-6)

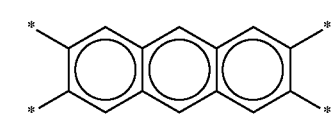

(X-1-7)

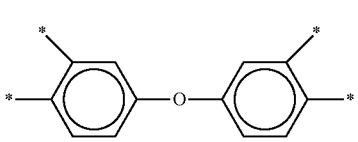

(X-1-8)

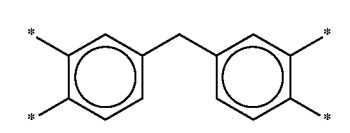

(X-1-9)

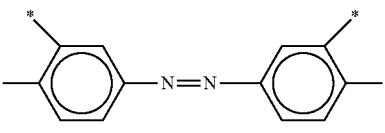

(X-2-1)

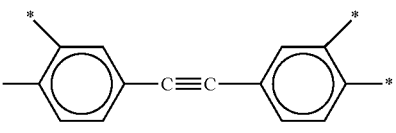

(X-2-2)

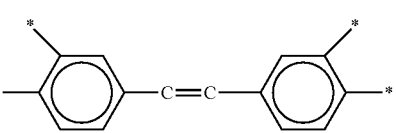

(X-2-3)

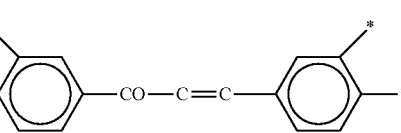

(X-2-4)

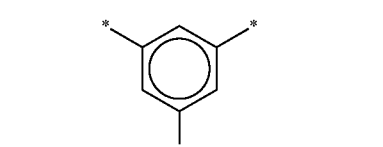

(Y-1-1)

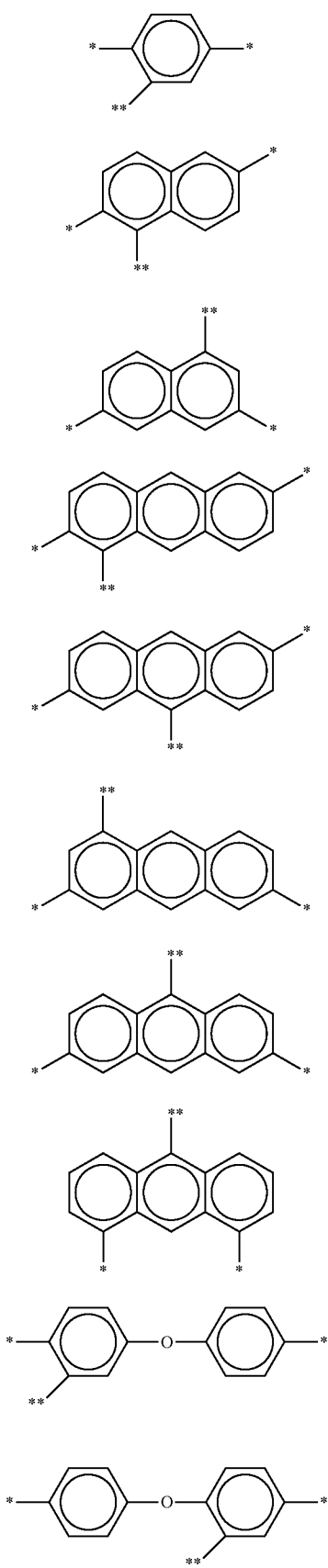
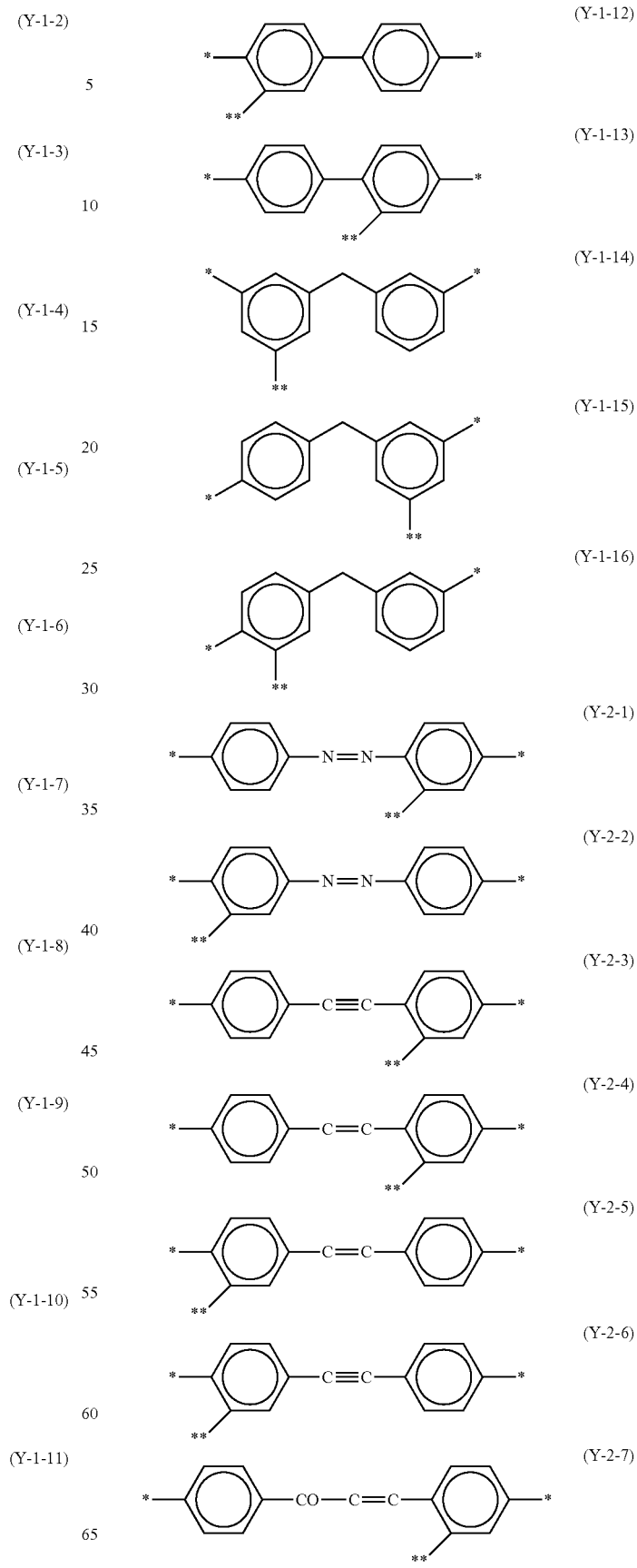

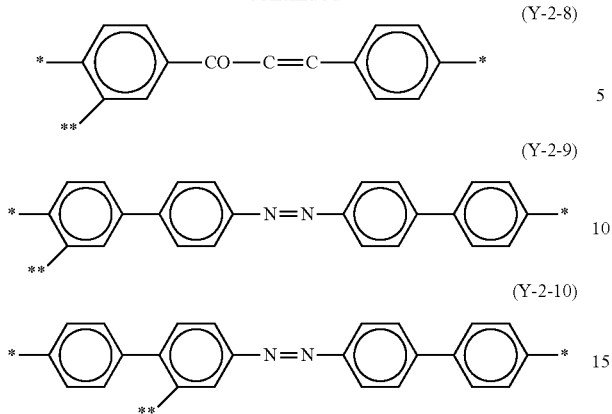

wherein Y¹ above is any one of the structures represented by the chemical formulas (Y-2-1) to (Y-2-10).

2. The liquid crystal alignment agent according to claim 1, wherein at least one of R¹ and R² above is the photoreactive functional group.

3. The liquid crystal alignment agent according to claim 2, wherein Y¹ and Y² above are the same or different, and are any one of the structures represented by the chemical formulas (Y-2-1) to (Y-2-10).

4. The liquid crystal alignment agent according to claim 2, wherein W above is any one of the structures represented by the chemical formulas (W-1-1) to (W-1-11).

5. The liquid crystal alignment agent according to claim 1, wherein X above is any one of the structures represented by the chemical formulas (X-1-1) to (X-1-9).

6. The liquid crystal alignment agent according to claim 1, wherein X above is any one of the structures represented by the chemical formulas (X-2-1) to (X-2-4).

7. The liquid crystal alignment agent according to claim 1, wherein the photoreactive functional group is any one of a cinnamate group, a chalcone group, an azobenzene group, a coumarin group, a tolan group, and a stilbene group.

8. A liquid crystal alignment agent comprising a copolymer including a structure represented by a chemical formula (1) below and a solvent,

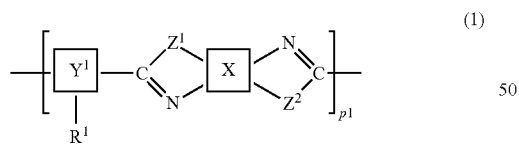

wherein X is any one of structures represented by chemical formulas (X-1-1) to (X-1-9) below, or any one of structures represented by chemical formulas (X-2-1) to (X-2-4) below, Y¹ is any one of structures represented by chemical formulas (Y-1-1) to (Y-1-16) below, or any one of structures represented by chemical formulas (Y-2-1) to (Y-2-10) below, Z¹ and Z² are the same or different, and represent an —NH— group, an —O— group, or a —S— group, R¹ represents a photoreactive functional group, and p¹ represents a repeat number and is an integer of 1 or more,

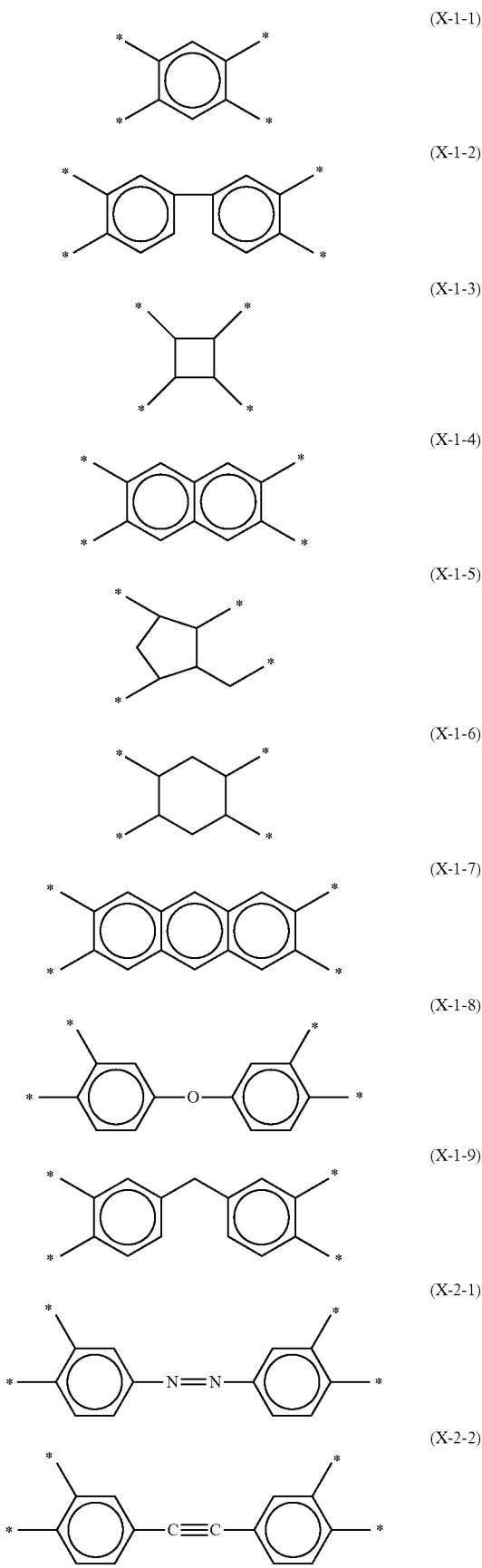

(X-2-3)
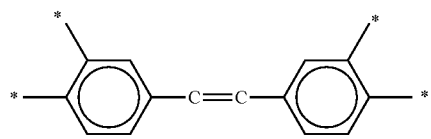
(X-2-4)
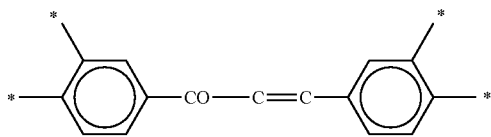
(Y-1-1)
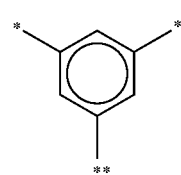
(Y-1-2)
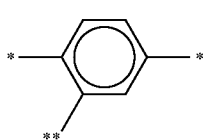
(Y-1-3)
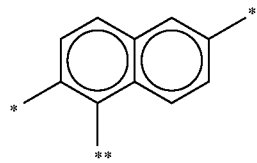
(Y-1-4)
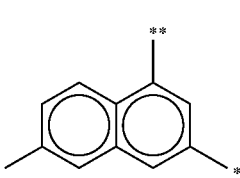
(Y-1-5)
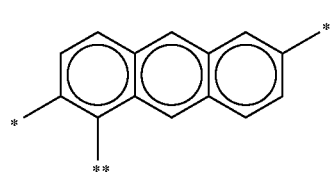
(Y-1-6)
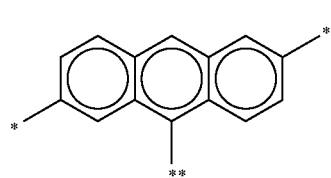
(Y-1-7)
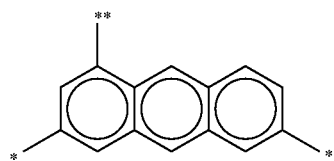
(Y-1-8)
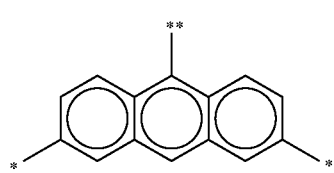
(Y-1-9)
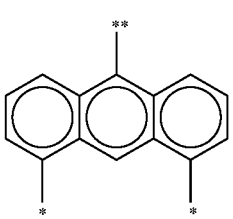
(Y-1-10)
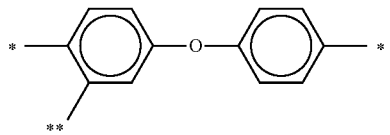
(Y-1-11)
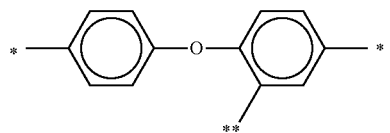
(Y-1-12)
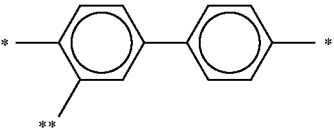
(Y-1-13)
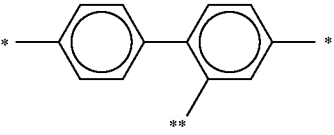
(Y-1-14)
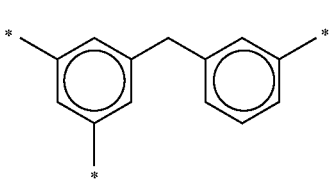

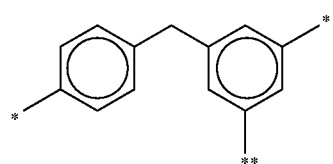
(Y-1-15)
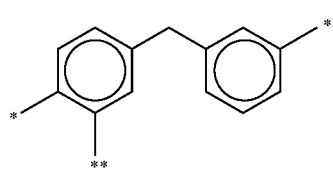
(Y-1-16)
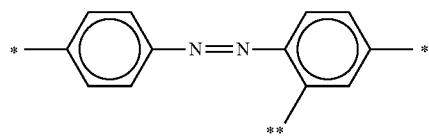
(Y-2-1)
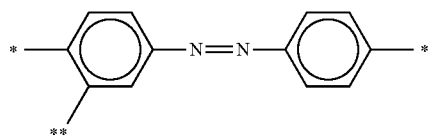
(Y-2-2)
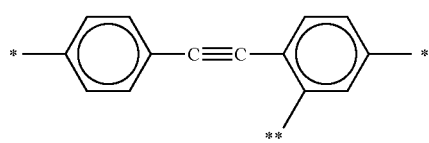
(Y-2-3)
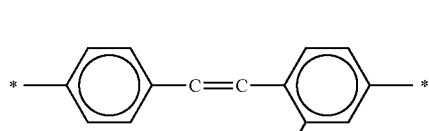
(Y-2-4)
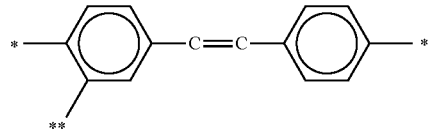
(Y-2-5)
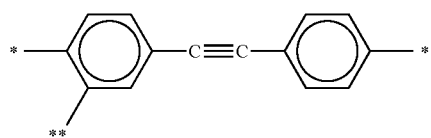
(Y-2-6)
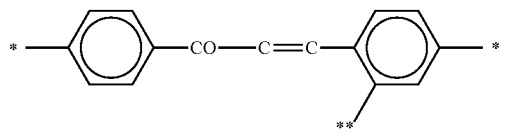
(Y-2-7)
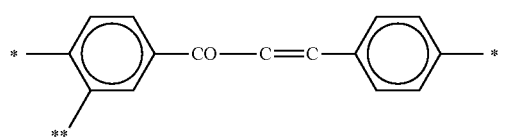
(Y-2-8)
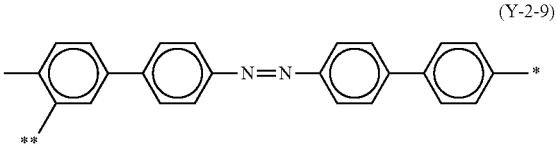
(Y-2-9)
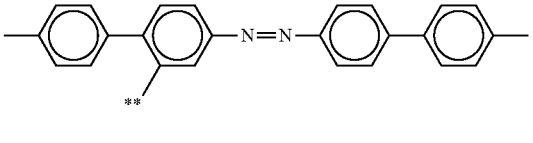
(Y-2-10)
wherein the copolymer is represented by a chemical formula (2) below,
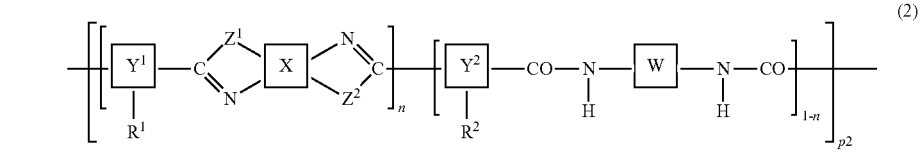
(2)

where wherein X is any one of the structures represented by the chemical formulas (X-1-1) to (X-1-9) or any one of the structures represented by the chemical formulas (X-2-1) to (X-2-4), $Y^1$ and $Y^2$ are the same or different, and are any one of the structures represented by the chemical formulas (Y-1-1) to (Y-1-16), or any one of the structures represented by the chemical formulas (Y-2-1) to (Y-2-10), $Z^1$ and $Z^2$ are the same or different, and represent an —NH— group, an —O— group, or a —S— group, $R^1$ and $R^2$ are the same or different, and represent a photoreactive functional group, W is any one of structures represented by chemical formulas (W-1-1) to (W-1-11) below, or any one of structures represented by chemical formulas (W-2-1) to (W-2-5) below, n is a real number of more than 0 and less than 1, and $p^2$ represents a repeat number, and is an integer of 1 or more),

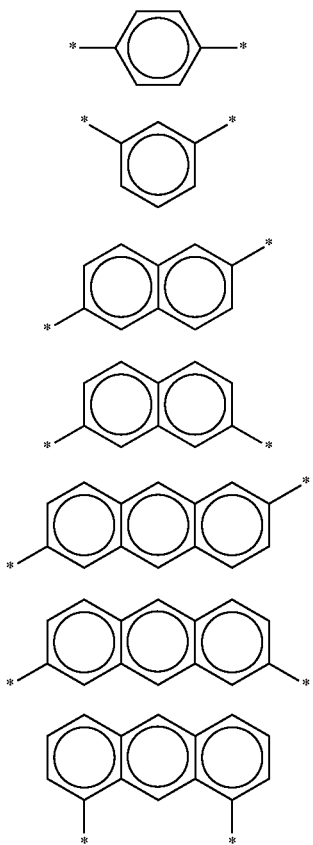

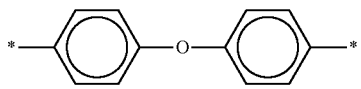

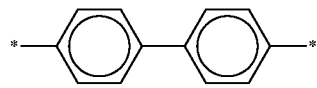

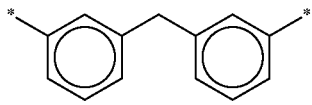

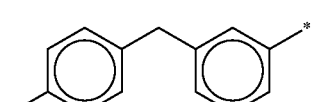

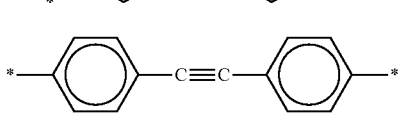

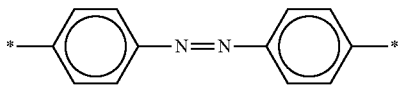

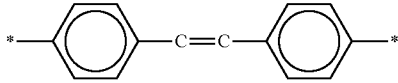

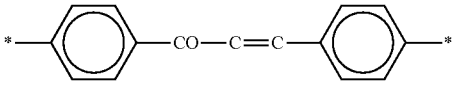

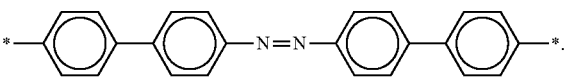

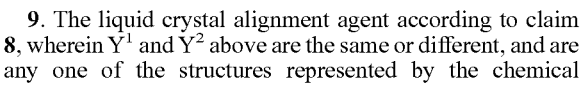

9. The liquid crystal alignment agent according to claim 8, wherein $Y^1$ and $Y^2$ above are the same or different, and are any one of the structures represented by the chemical formulas (Y-1-1) to (Y-1-16).

10. The liquid crystal alignment agent according to claim 8, wherein W above is any one of the structures represented by the chemical formulas (W-2-1) to (W-2-5).

11. The liquid crystal alignment agent according to claim 8, wherein $Y^1$ and $Y^2$ above are the same or different, and are any one of the structures represented by the chemical formulas (Y-2-1) to (Y-2-10).

12. The liquid crystal alignment agent according to claim 8, wherein W above is any one of the structures represented by the chemical formulas (W-1-1) to (W-1-11).

\* \* \* \* \*